US010112181B2

(12) United States Patent
Katoh et al.

(10) Patent No.: US 10,112,181 B2
(45) Date of Patent: Oct. 30, 2018

(54) CATALYST FOR PURIFICATION OF EXHAUST GAS, METHOD FOR PRODUCING THE SAME, AND METHOD FOR PURIFICATION OF EXHAUST GAS USING THE SAME

(71) Applicants: KABUSHIKI KAISHA TOYOTA CHUO KENKYUSHO, Nagakute-shi, Aichi (JP); TOYOTA JIDOSHA KABUSHIKI KAISHA, Toyota-shi, Aichi (JP); CATALER CORPORATION, Kakegawa-shi, Shizuoka (JP)

(72) Inventors: Satoru Katoh, Nagakute (JP); Toshitaka Tanabe, Nagakute (JP); Masahide Miura, Toyota (JP); Hiromasa Suzuki, Toyota (JP); Hiroaki Naito, Kikugawa (JP); Hirotaka Ori, Kakegawa (JP); Keiichi Narita, Kakegawa (JP); Michihiko Takeuchi, Kakegawa (JP); Tatsuya Ohashi, Kakegawa (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP); CATALER CORPORATION, Kakegawa-shi (JP)

(*) Notice: Subject to any disclaimer, the term of this patent is extended or adjusted under 35 U.S.C. 154(b) by 0 days.

(21) Appl. No.: 15/553,020

(22) PCT Filed: Feb. 17, 2016

(86) PCT No.: PCT/JP2016/054612
§ 371 (c)(1),
(2) Date: Aug. 23, 2017

(87) PCT Pub. No.: WO2016/136560
PCT Pub. Date: Sep. 1, 2016

(65) Prior Publication Data
US 2018/0243728 A1 Aug. 30, 2018

(30) Foreign Application Priority Data
Feb. 27, 2015 (JP) ................................. 2015-037879

(51) Int. Cl.
B01J 23/63 (2006.01)
B01D 53/94 (2006.01)
B01J 35/02 (2006.01)
B01J 35/10 (2006.01)
B01J 37/02 (2006.01)
B01J 37/08 (2006.01)
B01J 35/04 (2006.01)
F01N 3/28 (2006.01)

(52) U.S. Cl.
CPC .............. *B01J 23/63* (2013.01); *B01D 53/94* (2013.01); *B01J 35/023* (2013.01); *B01J 35/04* (2013.01); *B01J 35/1076* (2013.01); *B01J 37/0219* (2013.01); *B01J 37/08* (2013.01); *F01N 3/28* (2013.01); *B01D 2255/1021* (2013.01); *B01D 2255/407* (2013.01); *B01D 2255/9202* (2013.01); *F01N 2330/02* (2013.01); *F01N 2330/06* (2013.01); *F01N 2510/068* (2013.01)

(58) Field of Classification Search
CPC ................ B01D 53/94; B01D 2255/00; B01D 2255/90; B01D 2258/01; B01J 21/00; B01J 23/00; B01J 35/00; B01J 35/002; B01J 35/10; B01J 35/1052; B01J 37/00
See application file for complete search history.

(56) References Cited

U.S. PATENT DOCUMENTS

| 4,771,029 A * | 9/1988 | Pereira ................. B01D 53/945 423/213.5 |
| 4,859,433 A | 8/1989 | Pereira et al. |
| 2010/0101212 A1 | 4/2010 | Iwachido et al. |
| 2013/0171036 A1* | 7/2013 | Mori .................... B01D 53/944 422/180 |

FOREIGN PATENT DOCUMENTS

| EP | 2 168 662 A * | 3/2010 | ......... B01D 46/2429 |
| EP | 2168662 A1 | 3/2010 | |

(Continued)

OTHER PUBLICATIONS

Apr. 12, 2016 Search Report issued in International Patent Application No. PCT/JP2016/054612.

Primary Examiner — Timothy C Vanoy
(74) Attorney, Agent, or Firm — Oliff PLC

(57) ABSTRACT

A catalyst for purification of exhaust gas, wherein a substrate and a catalyst coat layer which is formed on a surface of the substrate and which comprises catalyst particles, wherein the catalyst coat layer has an average thickness in a range of 25 to 160 μm, and a void fraction in a range of 50 to 80% by volume as measured by a weight-in-water method, 0.5 to 50% by volume of all voids in the catalyst coat layer consist of high-aspect ratio pores which have equivalent circle diameters in a range of 2 to 50 μm in a cross-sectional image of a cross-section of the catalyst coat layer which the cross-section is perpendicular to a flow direction of exhaust gas in the substrate, and which have aspect ratios of 5 or higher, and the high-aspect ratio pores have an average aspect ratio in a range of 10 to 50.

9 Claims, 9 Drawing Sheets

(56) References Cited

FOREIGN PATENT DOCUMENTS

| | | | | |
|---|---|---|---|---|
| JP | S63-287558 A | 11/1988 | | |
| JP | 2009 000663 A | * 1/2009 | ............. | B01J 23/66 |
| JP | 2009-000663 A | 1/2009 | | |
| JP | 2010-082615 A | 4/2010 | | |
| JP | 2010-104897 A | 5/2010 | | |
| JP | 2012 240027 A | * 12/2012 | ............. | B01J 23/63 |
| JP | 2012-240027 A | 12/2012 | | |
| JP | 2016-182585 A | 10/2016 | | |
| JP | 2016-182586 A | 10/2016 | | |
| JP | 2016-185492 A | 10/2016 | | |
| JP | 2016-185493 A | 10/2016 | | |
| JP | 2016-185495 A | 10/2016 | | |
| JP | 2016-185497 A | 10/2016 | | |

* cited by examiner

CATALYST FOR PURIFICATION OF EXHAUST GAS, METHOD FOR PRODUCING THE SAME, AND METHOD FOR PURIFICATION OF EXHAUST GAS USING THE SAME

TECHNICAL FIELD

The present invention relates to a catalyst for purification of exhaust gas, a method for producing the same, and a method for purification of exhaust gas using the same.

BACKGROUND ART

Conventionally, as catalysts for purification of exhaust gas mounted on automobiles and the like, three-way catalysts, oxidation catalysts, NOx storage reduction-type catalysts, and the like have been developed to remove harmful components such as harmful gases (hydrocarbons (HC), carbon monoxide (CO), nitrogen oxides (NOx)) contained in exhaust gas. In addition, with the recent increased environmental consciousness, regulations of exhaust gas emitted from automobiles and the like have been tightened further. With these tightened regulations, improvements of these catalysts are being advanced.

As such a catalyst for purification of exhaust gas, Japanese Unexamined Patent Application Publication No. 2012-240027 (Patent Document 1) discloses a catalyst for purification of exhaust gas comprising a catalyst layer, wherein multiple voids are present in the catalyst layer, a mode of a frequency distribution regarding diameter to length ratios (D/L) of the voids in cross-sections thereof is 2 or greater, the ratio of the voids in the catalyst layer is 15% by volume or higher and 30% by volume or lower, and a thickness of the catalyst layer at a thickest portion is 150 μm or less. However, the catalyst for purification of exhaust gas disclosed in Patent Document 1 is not necessarily sufficient in terms of a catalytic performance in a high-load region with a high gas flow rate.

Moreover, catalysts for purification of exhaust gas have been recently required to have more advanced properties, and there arises a demand for a catalyst for purification of exhaust gas capable of exhibiting an excellent catalyst performance also in a high-load region with a high gas flow rate.

CITATION LIST

Patent Literature

[PTL 1] Japanese Unexamined Patent Application Publication No. 2012-240027

SUMMARY OF INVENTION

Technical Problem

The present invention has been made in view of the above-described problems of the conventional technique, and an object of the present invention is to provide a catalyst for purification of exhaust gas capable of exhibiting an excellent catalyst performance also in a high-load region with a high gas flow rate, a method for producing the same, and a method for purification of exhaust gas using the same.

Solution to Problem

The present inventors have conducted intensive study to achieve the above-described object, and consequently have found that a catalyst for purification of exhaust gas capable of exhibiting an excellent catalyst performance also in a high-load region with a high gas flow rate can be obtained as follows. Specifically, a catalyst slurry is prepared by mixing metal oxide particles having a specific particle diameter, a noble metal raw material, and a specific amount of a fibrous organic material having a specific average diameter and a specific average aspect ratio; a catalyst slurry layer is formed by applying this catalyst slurry onto a surface of a substrate to achieve a specific average thickness; and at least part of the fibrous organic material is removed by calcination. This finding has led to the completion of the present invention.

Specifically, a catalyst for purification of exhaust gas of the present invention comprises:

a substrate; and a catalyst coat layer which is formed on a surface of the substrate and which comprises catalyst particles, wherein the catalyst coat layer has an average thickness in a range of 25 to 160 μm, and a void fraction in a range of 50 to 80% by volume as measured by a weight-in-water method, 0.5 to 50% by volume of all voids in the catalyst coat layer consist of high-aspect ratio pores which have equivalent circle diameters in a range of 2 to 50 μm in a cross-sectional image of a cross-section of the catalyst coat layer which the cross-section is perpendicular to a flow direction of exhaust gas in the substrate, and which have aspect ratios of 5 or higher, and the high-aspect ratio pores have an average aspect ratio in a range of 10 to 50.

In the catalyst for purification of exhaust gas of the present invention, the high-aspect ratio pores are preferably oriented such that a cumulative 80% angle value in an angle-based cumulative angle distribution of angles (cone angles) each formed by a vector in a long diameter direction and a vector in the flow direction of exhaust gas in the substrate is in a range of 0 to 45 degrees.

In addition, in the catalyst for purification of exhaust gas of the present invention, 0.6 to 40.9% by volume of all the voids in the catalyst coat layer preferably consist of the high-aspect ratio pores, and the high-aspect ratio pores preferably have an average aspect ratio in a range of 10 to 35.

Moreover, in the catalyst for purification of exhaust gas of the present invention, particle diameters of the catalyst particles are preferably such that a cumulative 15% diameter value in a cross-sectional area-based cumulative particle size distribution of the catalyst particles based on scanning electron microscope (SEM) observation of a cross-section of the catalyst coat layer is in a range of 3 to 10 μm.

In addition, in the catalyst for purification of exhaust gas of the present invention, a coating amount of the catalyst coat layer is preferably in a range of 50 to 300 g/L per unit volume of the substrate.

A method for producing a catalyst for purification of exhaust gas of the present invention comprises:

a step of obtaining a catalyst slurry by mixing metal oxide particles having a cumulative 50% diameter value in a range of 3 to 10 μm in a volume-based cumulative particle size distribution measured by laser diffractometry, a noble metal raw material, and a fibrous organic material having an average fiber diameter in a range of 1.7 to 8.0 μm and having an average aspect ratio in a range of 9 to 40 such that an amount of the fibrous organic material is in a range of 0.5 to 9.0 parts by mass relative to 100 parts by mass of the metal oxide particles;

a step of forming a catalyst slurry layer by applying the catalyst slurry onto a surface of a substrate such that a catalyst coat layer after calcination has an average thickness in a range of 25 to 160 μm; and a calcination step of removing at least part of the fibrous organic material in the catalyst slurry layer to obtain a catalyst for purification of exhaust gas.

In the method for producing a catalyst for purification of exhaust gas of the present invention, the fibrous organic material preferably has an average fiber diameter in a range of 2.0 to 6.0 μm and an average aspect ratio in a range of 9 to 30.

In addition, in the method for producing a catalyst for purification of exhaust gas of the present invention, the catalyst slurry is preferably applied onto the surface of the substrate such that a coating amount of the catalyst coat layer after the calcination is in a range of 50 to 300 g/L per unit volume of the substrate, in the step of forming a catalyst slurry layer.

A method for purification of exhaust gas of the present invention comprises: bringing exhaust gas emitted from an internal combustion engine into contact with the above-described catalyst for purification of exhaust gas of the present invention to purify the exhaust gas.

Note that although it is not exactly clear why the above-described object is achieved by the catalyst for purification of exhaust gas, the method for producing the same, and the method for purification of exhaust gas using the same of the present invention, the present inventors speculate as follows.

Specifically, it is presumed that since the catalyst for purification of exhaust gas of the present invention comprises: a substrate; and a catalyst coat layer which is formed on a surface of the substrate and which comprises catalyst particles, and since the catalyst coat layer has an average thickness in a range of 25 to 160 μm, the diffusion resistance (average thickness of catalyst coat layer/effective diffusion coefficient of catalyst coat layer) of the catalyst coat layer is suppressed within a range where an excellent catalyst performance can be exhibited also in a high-load region with a high gas flow rate.

In addition, it is presumed that since the void fraction of the catalyst coat layer measured by a weight-in-water method is in a range of 50 to 80% by volume, the diffusion resistance (average thickness of catalyst coat layer/effective diffusion coefficient of catalyst coat layer) of the catalyst coat layer is suppressed within a range where an excellent catalyst performance can be exhibited also in a high-load region with a high gas flow rate. This is because the effective diffusion coefficient of a catalyst coat layer is proportional to the void fraction of the catalyst coat layer, as described in reference literature ("Reaction Engineering" authored by Kenji Hashimoto, BAIFUKAN CO., LTD (2001), p. 222).

It is also presumed that since 0.5 to 50% by volume of all voids in the catalyst coat layer consist of high-aspect ratio pores which have equivalent circle diameters in a range of 2 to 50 μm in a cross-sectional image of a cross-section of the catalyst coat layer which the cross-section is perpendicular to a flow direction of exhaust gas in the substrate, and which have aspect ratios of 5 or higher, and since the high-aspect ratio pores have an average aspect ratio in a range of 10 to 50, the gas diffusibility (expressed as the effective diffusion coefficient of the catalyst coat layer) in the catalyst coat layer can be improved, so that an excellent catalyst performance can be exhibited also in a high-load region with a high gas flow rate.

The present inventors speculate that these functions make the catalyst for purification of exhaust gas of the present invention capable of exhibiting an excellent catalyst performance also in a high-load region with a high gas flow rate.

Meanwhile, in the method for producing a catalyst for purification of exhaust gas of the present invention, a catalyst slurry is prepared by mixing metal oxide particles having a volume-based cumulative 50% diameter value in a range of 3 to 10 μm as measured by laser diffractometry, a noble metal raw material, and a fibrous organic material having an average fiber diameter in a range of 1.7 to 8.0 μm and having an average aspect ratio in a range of 9 to 40 such that an amount of the fibrous organic material is in a range of 0.5 to 9.0 parts by mass relative to 100 parts by mass of the metal oxide particles; a catalyst slurry layer is formed by applying this catalyst slurry onto a surface of a substrate such that a catalyst coat layer after calcination has an average thickness in a range of 25 to 160 μm; and at least part of the fibrous organic material in the catalyst slurry layer is removed by calcination. The present inventors speculate that, for this reason, it is possible to obtain a catalyst for purification of exhaust gas having the above-described characteristics.

Advantageous Effects of Invention

According to the present invention, it is possible to provide a catalyst for purification of exhaust gas capable of exhibiting an excellent catalyst performance also in a high-load region with a high gas flow rate, a method for producing the same, and a method for purification of exhaust gas using the same.

DESCRIPTION OF EMBODIMENTS

Figure 1:
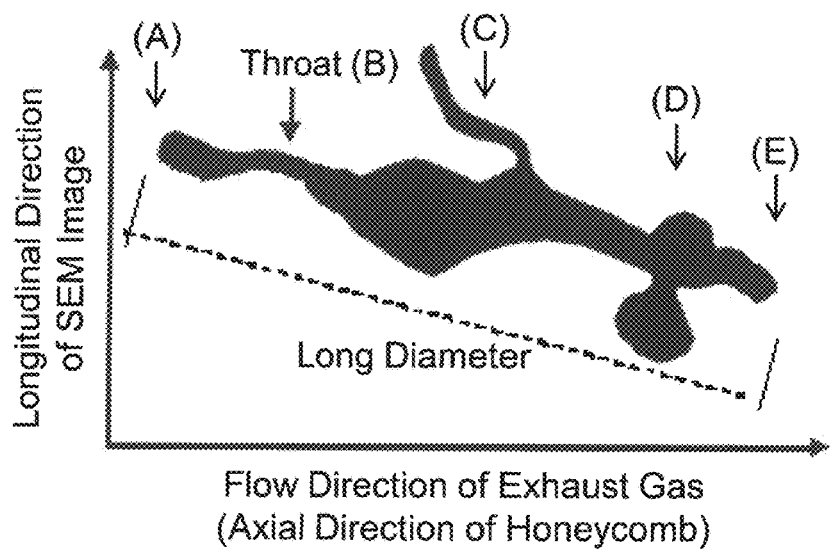
FIG. 1 is a two-dimensional projection illustrating three-dimensional information about a pore obtained by analyzing consecutive cross-sectional images of cross-sections of a catalyst coat layer which the cross-sections are perpendicular to a flow direction of exhaust gas in a substrate of a catalyst for purification of exhaust gas of the present invention.

Hereinafter, the present invention will be described in detail based on preferred embodiments thereof.

[Catalyst for Purification of Exhaust Gas]

A catalyst for purification of exhaust gas of the present invention comprises:

a substrate; and a catalyst coat layer which is formed on a surface of the substrate and which comprises catalyst particles, wherein the catalyst coat layer has an average thickness in a range of 25 to 160 µm, and a void fraction in a range of 50 to 80% by volume as measured by a weight-in-water method, 0.5 to 50% by volume of all voids in the catalyst coat layer consist of high-aspect ratio pores which have equivalent circle diameters in a range of 2 to 50 µm in a cross-sectional image of a cross-section of the catalyst coat layer which the cross-section is perpendicular to a flow direction of exhaust gas in the substrate, and which have aspect ratios of 5 or higher, and the high-aspect ratio pores have an average aspect ratio in a range of 10 to 50. The thus configured catalyst for purification of exhaust gas is capable of exhibiting an excellent catalyst performance also in a high-load region with a high gas flow rate.

(Substrate)

The substrate in the catalyst for purification of exhaust gas of the present invention is not particularly limited, and it is possible to use a known substrate which can be used as a substrate for a catalyst for purification of exhaust gas. The substrate is preferably a honeycomb-shaped substrate. The honeycomb-shaped substrate is not particularly limited, and it is possible to use a known honeycomb-shaped substrate which can be used as a substrate for a catalyst for purification of exhaust gas. Specifically, it is preferable to employ a honeycomb-shaped monolithic substrate (honeycomb filter, high-density honeycomb, or the like). In addition, a material of the substrate is not particularly limited, either, and it is preferable to employ a substrate made of a ceramic such as cordierite, silicon carbide, silica, alumina, or mullite, or a substrate made of a metal such as stainless steel containing chromium and aluminum. Of these materials, cordierite is preferable from the viewpoint of cost.

(Catalyst Coat Layer)

The catalyst coat layer in the catalyst for purification of exhaust gas of the present invention is formed on a surface of the substrate, and comprises catalyst particles. The catalyst coat layer is preferably one consisting of the catalyst particles, and particularly preferably porous one consisting of the catalyst particles.

The catalyst particles in the catalyst coat layer are not particularly limited, as long as the catalyst particles have an exhaust gas purification performance. Specifically, it is possible to use catalyst particles in which a noble metal is supported on catalyst substrate particles (oxide particles (preferably, porous oxide particles)) made of an oxide such as aluminum oxide ($Al_2O_3$, alumina), cerium oxide ($CeO_2$, ceria), zirconium oxide ($ZrO_2$, zirconia), silicon oxide ($SiO_2$, silica), yttrium oxide ($Y_2O_3$, yttria), or neodymium oxide ($Nd_2O_3$), a composite oxide thereof, or the like.

The noble metal is not particularly limited, and it is preferable to use at least one selected from the group consisting of platinum (Pt), palladium (Pd), rhodium (Rh), gold (Au), silver (Ag), iridium (Ir), and ruthenium (Ru). Of these noble metals, at least one selected from the group consisting of Pt, Rh, Pd, Ir, and Ru is more preferable, and at least one selected from the group consisting of Pt, Rh, and Pd is particularly preferable, from the viewpoint of catalytic performance. The amount of the noble metal supported is not particularly limited, and the noble metal may be supported in a necessary amount, as appropriate, according to the intended design and the like. However, the amount of the noble metal supported is preferably 0.01 to 10 parts by mass, and more preferably 0.01 to 5 parts by mass in terms of metal relative to 100 parts by mass of the catalyst substrate particles (oxide particles). If the amount of the noble metal supported is less than the lower limit, the catalytic activity tends to be insufficient. Meanwhile, if the noble metal is supported in an amount exceeding the upper limit, the catalytic activity tends to be saturated, and the costs tend to increase.

A coating amount of the catalyst coat layer in the catalyst for purification of exhaust gas of the present invention is preferably in a range of 50 to 300 g/L per unit volume of the substrate. If the coating amount is less than the lower limit, the catalyst particles do not provide sufficient catalytic activity performance, so that the obtained catalytic performance such as NOx purification performance tends to be insufficient. Meanwhile, if the coating amount exceeds the upper limit, the pressure drop tends to increase, causing decrease in fuel-efficiency. Furthermore, the coating amount of the catalyst coat layer is more preferably in a range of 50 to 250 g/L and particularly preferably in a range of 50 to 200 g/L per unit volume of the substrate, from the viewpoint of the balance among the pressure drop, the catalytic performance, and the durability.

In addition, the catalyst coat layer in the catalyst for purification of exhaust gas of the present invention has to have an average thickness in a range of 25 to 160 μm. If the average thickness is less than the lower limit, a sufficient catalytic performance cannot be obtained. Meanwhile, if the average thickness exceeds the upper limit, the pressure drop of exhaust gas and the like passing through the catalyst coat layer increases, so that the obtained catalytic performance such as NOx purification performance is insufficient. Furthermore, the average thickness of the catalyst coat layer is preferably in a range of 30 to 96 μm, and particularly preferably in a range of 32 to 92 μm, from the viewpoint of the balance among the pressure drop, the catalytic performance, and the durability. Note that the "thickness" refers to a length of the catalyst coat layer in a direction perpendicular to a center of a flat portion of the substrate. Furthermore, the thickness is determined by subjecting the catalyst coat layer to scanning electron micrograph (SEM) observation, optical microscopic observation, or the like, and the "average thickness" can be determined by measuring the thicknesses at randomly selected 10 or more points and calculating the average value of the thicknesses.

Moreover, the particle diameters of the catalyst particles in the catalyst coat layer of the catalyst for purification of exhaust gas of the present invention are preferably such that a cumulative 15% diameter value in a cross-sectional area-based cumulative particle size distribution of the catalyst particles based on scanning electron microscope (SEM) observation of a cross-section of the catalyst coat layer is in a range of 3 to 10 μm. If the particle diameter (cross-sectional area-based cumulative 15% diameter value) of the catalyst particles is less than the lower limit, the void fraction of the catalyst coat layer tends to be low and the gas diffusibility tends to deteriorate, so that the obtained catalytic performance such as NOx purification performance tends to be insufficient. Meanwhile, if the particle diameter exceeds the upper limit, the gas diffusion resistance inside the catalyst particles increases, so that the obtained catalytic performance such as NOx purification performance tends to be insufficient. Furthermore, the particle diameters of the catalyst particles of the catalyst coat layer are such that the cross-sectional area-based cumulative 15% diameter value is more preferably in a range of 3 to 9 μm, and particularly preferably in a range of 3 to 7 μm, from the viewpoints of the balance between the diffusion resistances in the catalyst coat layer and in the catalyst particles and of the slurry coatability.

Note that the particle diameter (cross-sectional area-based cumulative 15% diameter value) of the catalyst particles can be determined by scanning electron microscopic (SEM) observation. Specifically, for example, the catalyst for purification of exhaust gas is embedded in an epoxy resin or the like, and a cross-section obtained by cutting the substrate (honeycomb-shaped substrate) in a radial direction is subjected to scanning microscopic (SEM) observation (magnification: 700 to 1500 fold, pixel resolution: 0.2 mm/pixel or higher). Then, the cumulative 15% diameter value is calculated in a cross-sectional area-based cumulative particle size distribution of the catalyst particles. Here, the cumulative 15% diameter of the catalyst particles means the particle diameter of the catalyst particle (hereinafter, also referred to as "D15") such that, when the cross-sectional areas of the catalyst particles are counted from the largest catalyst particle size (cross-sectional area) among those of the catalyst particles, the sum of the cross-sectional areas of the catalyst particles reaches 15% of all the cross-sectional areas of the catalyst coat layer except for those of pores with cross-sectional areas of less than 0.3 μm$^2$ (the area-based cumulative frequency reaches 15%). This observation can be performed in a quadrilateral region of the catalyst coat layer extending over 200 μm or more in a horizontal direction to the flat portion of the substrate and 25 μm or more in the direction perpendicular to the flat portion of the substrate. Furthermore, when the cross-section is not circular, the particle diameter refers to a diameter of a smallest circumcircle.

In addition, the void fraction of the catalyst coat layer in the catalyst for purification of exhaust gas of the present invention has to be in a range of 50 to 80% by volume in terms of a void fraction measured by a weight-in-water method. If the void fraction is less than the lower limit, the gas diffusibility deteriorates, so that the obtained catalytic performance is insufficient. Meanwhile, if the void fraction exceeds the upper limit, the excessively high diffusibility increases the ratio of gas passing through the coat layer without contact with any active sites of the catalyst, so that the obtained catalytic performance is insufficient. Furthermore, the void fraction of the catalyst coat layer is preferably in a range of 50.9 to 78.8% by volume, and particularly preferably in a range of 54.0 to 78.0% by volume, from the viewpoint of the balance between the gas diffusibility and the catalytic performance. Note that a "void" in the catalyst coat layer means that the catalyst coat layer has a space. The shape of the "void" is not particularly limited, and, for example, may be any one of a spherical shape, an elliptical shape, a cylindrical shape, a cuboid (prism) shape, a disk shape, a through-passage shape, shapes similar to any of them, and the like. The voids include pores such as fine pores having cross-sectional equivalent circle diameters of less than 2 μm; high-aspect ratio pores having cross-sectional equivalent circle diameters of 2 μm or more and having aspect ratios of 5 or higher; pores having cross-sectional equivalent circle diameters of 2 μm or more but not having aspect ratios of 5 or higher; and the like. The void fraction of the catalyst coat layer can be determined by subjecting the catalyst for purification of exhaust gas to a weight-in-water method. Specifically, the void fraction of the catalyst sample can be determined, for example, according to JIS R 2205.

Moreover, the catalyst coat layer in the catalyst for purification of exhaust gas of the present invention is preferably such that at least two peaks are present in a pore diameter distribution measured by a mercury intrusion method, and a modal pore diameter of a peak (primary peak) with the largest modal pore diameter among these peaks is in a range of 1 to 10 μm. If the modal pore diameter of the primary peak is smaller than the lower limit, the gas diffusibility is so insufficient that the obtained catalytic performance tends to be insufficient. Meanwhile, if the modal pore diameter of the primary peak exceeds the upper limit, the ratio of gas passing through the coat layer without contact with any active sites of the catalyst increases, so that the obtained catalytic performance tends to be insufficient.

In addition, the catalyst coat layer of the present invention has to be such that 0.5 to 50% by volume of all voids consists of high-aspect ratio pores which have equivalent circle diameters in a range of 2 to 50 μm in a cross-sectional image of a cross-section of the catalyst coat layer which the cross-section is perpendicular to a flow direction of exhaust gas in the substrate, and which have aspect ratios of 5 or higher. If the ratio of the high-aspect ratio pores relative to all the voids is less than the lower limit, the connectivity of the pores is insufficient. Meanwhile, if the ratio exceeds the upper limit, the gas diffusibility in a direction perpendicular to the flow direction of exhaust gas is so insufficient that a sufficient catalytic performance cannot be obtained, and the decrease in strength of the catalyst coat layer causes exfoliation or the like. Furthermore, the ratio of the high-aspect ratio pores is preferably in a range of 0.6 to 40.9% by volume, and particularly preferably in a range of 1 to 31% by volume, from the viewpoint of the balance among the gas diffusibility, the catalytic performance, and the strength of the catalyst coat layer.

The high-aspect ratio pores in the catalyst coat layer of the present invention have to have an average aspect ratio in a range of 10 to 50. If the average aspect ratio of the high-aspect ratio pores is lower than the lower limit, the obtained connectivity of pores is insufficient. Meanwhile, if the average aspect ratio exceeds the upper limit, the excessively high diffusibility increases the ratio of gas passing through the coat layer without contact with any active sites of the catalyst, so that the obtained catalytic performance is insufficient. Furthermore, the average aspect ratio of the high-aspect ratio pores is preferably in a range of 10 to 35, and particularly preferably in a range of 10 to 30, from the viewpoint of achieving both the gas diffusibility and the catalytic performance.

Note that the "aspect ratios of pores" and the "average aspect ratio of high-aspect ratio pores" in the catalyst coat layer of the present invention can be determined by analyzing cross-sectional images of cross-sections of the catalyst coat layer which the cross-sections are perpendicular to the flow direction of exhaust gas in the substrate (the axial direction of the honeycomb-shaped substrate) from three-dimensional information about pores in the catalyst coat layer obtained by FIB-SEM (Focused Ion Beam-Scanning Electron Microscope), X-ray CT, or the like.

Specifically, for example, in the case of FIB-SEM analysis, first, consecutive cross-sectional images (SEM images) of cross-sections of the catalyst coat layer which the cross-sections are perpendicular to the flow direction of exhaust gas in the substrate are acquired by an FIB-SEM analysis. Next, the obtained consecutive cross-sectional images are analyzed to extract three-dimensional information about pores having cross-sectional equivalent circle diameters of 2 μm or more. As an example of the analysis results of the three-dimensional information about a pore, FIG. 1 shows an example of a two-dimensional projection illustrating an analysis result of three-dimensional information about a pore obtained by analyzing consecutive cross-sectional images of cross-sections of a catalyst coat layer which the cross-sections are perpendicular to a flow direction of exhaust gas in a substrate of a catalyst for purification of exhaust gas. Based on the analysis result of the three-dimensional information about the pore illustrated in FIG. 1, the shape of the pore is indefinite, and the distance connecting the starting point and the end point in the consecutive cross-sectional images (SEM images) of the pore is defined as "long diameter." Note that the starting point and the end point are at the centers of gravity in respective SEM images. Next, among constricted portions on the route connecting the starting point and the end point by the shortest distance in the consecutive cross-sectional images (SEM images) of the pore, a constricted portion having an equivalent circle diameter which is 2 μm or more and which is the smallest among the cross-sectional SEM images is defined as a "throat," and this equivalent circle diameter in the cross-sectional SEM image is defined as a "throat diameter" (although multiple constricted portions may be present in a pore in some cases, the smallest constricted portion on the route connecting the starting point and the end point by the shortest distance is selected as the throat diameter for calculating the aspect ratio, and the equivalent circle diameter of the smallest constricted portion (throat) in the cross-sectional SEM image is defined as the "throat diameter"). Moreover, the "aspect ratio of a pore" is defined as "long diameter/throat diameter."

Figure 2:
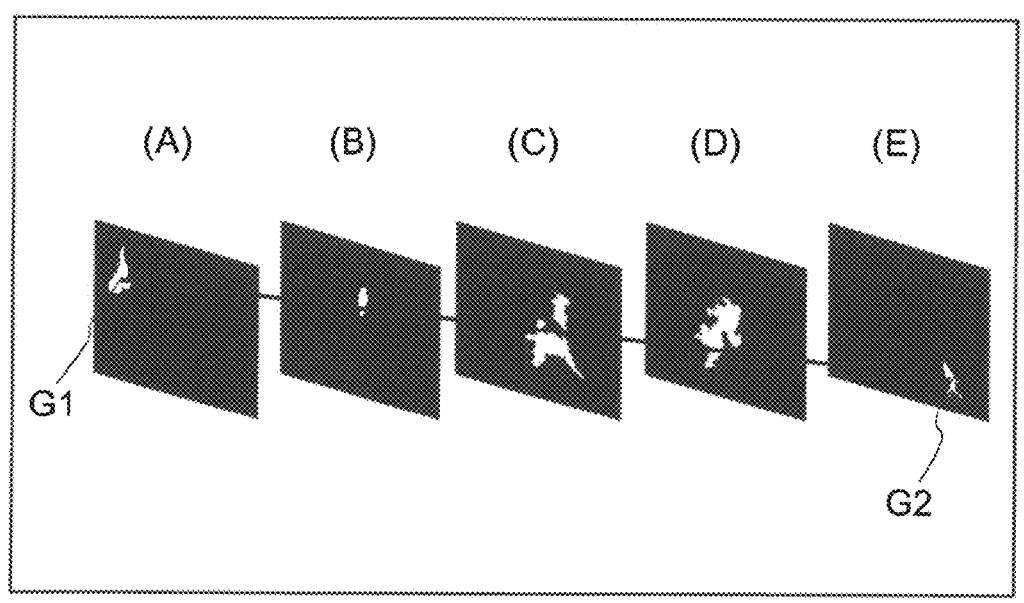
FIG. 2 is a schematic diagram showing the pore on the cross-sections of the catalyst coat layer at A to E in FIG. 1.

Next, FIG. 2 shows examples of cross-sectional images (SEM images) at (A) (starting point of pore), (B) (throat portion of pore), (C) (midpoint of long diameter of pore), (D) (largest diameter portion with largest equivalent circle diameter in pore), and (E) (end point of pore) in FIG. 1. FIG. 2 is a schematic diagram of the cross-sectional images (SEM images) showing the pore on the cross-sections of the catalyst coat layer at (A) to (E) of FIG. 1. Part (A) in FIG. 2 is a schematic diagram of a cross-sectional image of the pore at the starting point (one end portion at which the pore has an equivalent circle diameter of 2 μm or more) in the two-dimensional projection of the pore illustrated in FIG. 1, and G1 indicates the center of gravity of the pore in the cross-sectional image. Part (B) in FIG. 2 is a schematic diagram of a cross-sectional image of the pore at the throat (the constricted portion which has an equivalent circle diameter of 2 μm or more and which is the smallest on the route connecting the starting point and the end point by the shortest distance) in the two-dimensional projection of the pore illustrated in FIG. 1. Part (C) in FIG. 2 is a schematic diagram of a cross-sectional image of the pore at the midpoint on the route connecting the starting point and the end point of the long diameter by the shortest distance in the two-dimensional projection of the pore illustrated in FIG. 1. Part (D) in FIG. 2 is a cross-sectional image of the pore at a portion where the equivalent circle diameter is the largest on the route connecting the starting point and the end point of the long diameter by the shortest distance in the two-dimensional projection of the pore illustrated in FIG. 1. Part (E) in FIG. 2 is a schematic diagram of a cross-sectional image of the pore at the end point (the other end portion having an equivalent circle diameter of 2 μm or more) in the two-dimensional projection of the pore illustrated in FIG. 1, and G2 indicates the center of gravity of the pore in the cross-sectional image. Here, in FIG. 2, the distance of the straight line connecting the starting point (G1 shown in part (A) of FIG. 2) of the pore and the end point (G2 shown in part (E) of FIG. 2) of the pore is defined as the "long diameter." In addition, among constricted portions on the route connecting the starting point and the end point of the pore by the shortest distance, a constricted portion having an equivalent circle diameter which is 2 μm or more and which is the smallest among the cross-sectional SEM images is defined as a "throat," and this equivalent circle diameter in the cross-sectional SEM image is defined as a "throat diameter." The "aspect ratio of a pore" is defined as "long diameter/throat diameter." Moreover, the "average aspect ratio of high-aspect ratio pores" in a catalyst coat layer can be determined by performing the above-described measurement in a range of 500 μm or more in the horizontal direction to the flat portion of the substrate, 25 μm or more in the direction perpendicular to the flat portion of the substrate, and 500 μm or more in the axial direction, or a range equivalent thereto, of the catalyst coat layer, and calculating the average aspect ratio of the high-aspect ratio pores which are pores having aspect ratios of 5 or higher among the pores.

In addition, the ratio of the high-aspect ratio pores relative to all the voids in the catalyst coat layer of the present invention can be determined by dividing the void fraction of the high-aspect ratio pores in a range of 500 μm or more in the horizontal direction to the flat portion of the substrate, 25 μm or more in the direction perpendicular to the flat portion of the substrate, and 500 μm or more in the axial direction, or a range equivalent thereto, of the catalyst coat layer, by the void fraction of the catalyst coat layer obtained by measurement by the weight-in-water method.

Moreover, in the catalyst coat layer in the catalyst for purification of exhaust gas of the present invention, the high-aspect ratio pores are preferably oriented such that a cumulative 80% angle value in an angle-based cumulative angle distribution of angles (cone angles) each formed by a vector in a long diameter direction of each of the high-aspect ratio pores and a vector in the flow direction of exhaust gas in the substrate is in a range of 0 to 45 degrees. This configuration especially improves the gas diffusibility in the flow direction of exhaust gas (the axial direction of the honeycomb-shaped substrate), so that the efficiency of utilization of active sites can be improved. If the cumulative 80% angle value exceeds the upper limit, the axial-direction component of the gas diffusibility tends to be insufficient, resulting in decrease in the efficiency of utilization of active sites. Furthermore the cumulative 80% angle value is more preferably in a range of 15 to 45 degrees, and particularly preferably in a range of 30 to 45 degrees, from the viewpoint of catalytic performance.

Figure 3:
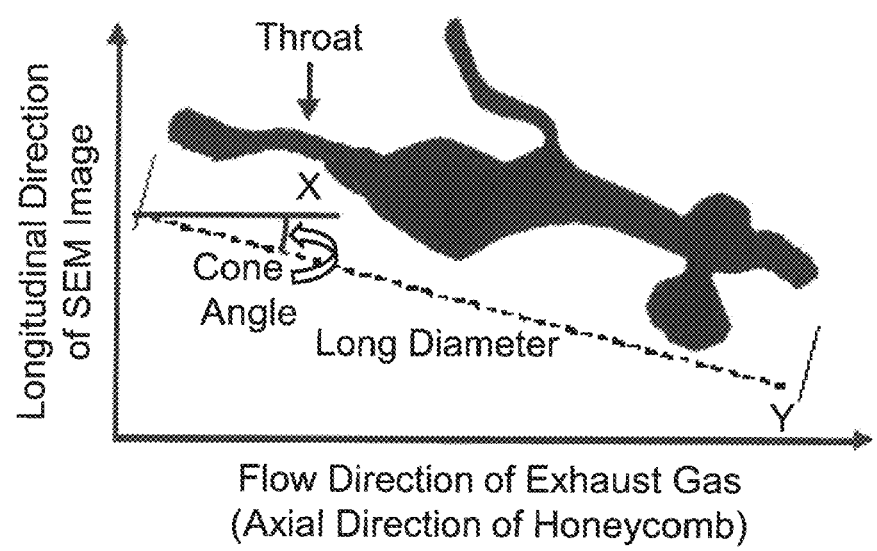
FIG. 3 is a schematic diagram showing a cone angle of a high-aspect ratio pore in the two-dimensional projection of FIG. 1.

Note that the cone angle (orientation angle) of a high-aspect ratio pore in the catalyst coat layer of the present invention can be determined by analyzing cross-sectional images of cross-sections of the catalyst coat layer which the cross-sections are perpendicular to the flow direction of exhaust gas in the substrate (the axial direction of the honeycomb-shaped substrate) from three-dimensional information about the pore in the catalyst coat layer. Specifically, for example, in the case of FIB-SEM analysis, the "cone angle" can be determined from the angle formed by a vector in a long diameter direction obtained by the "long diameter" of the high-aspect ratio pore obtained as described above and a vector in the flow direction of exhaust gas in the substrate. FIG. 3 is a schematic diagram showing the cone angle (orientation angle) of a high-aspect ratio pore, and shows an example of how to determine the "cone angle." FIG. 3 shows the vector (Y) in the long diameter direction of the high-aspect ratio pore and the vector (X) in the flow direction of exhaust gas in the substrate in the two-dimensional projection of FIG. 1, and the angle formed by the vector (Y) in the long diameter direction and the vector (X) in the flow direction of exhaust gas in the substrate is defined as the "cone angle." By an image analysis of the three-dimensional information (three-dimensional image) about the pores, the cumulative 80% angle value in an angle-based cumulative angle distribution of the above-described cone angles can be calculated. Here, the cumulative 80% angle in an angle-based cumulative angle distribution of the cone angles of the high-aspect ratio pores means the cone angle of an aspect ratio pore such that, when the high-aspect ratio pores are counted from the high-aspect ratio pore with the smallest cone angle (angle) among the high-aspect ratio pores, the number of the high-aspect ratio pores counted reaches 80% of the total number of the high-aspect ratio pores (the angle-based cumulative frequency of the cone angle reaches 80%). Note that the cumulative 80% angle value in an angle-based cumulative angle distribution of the cone angles of the high-aspect ratio pores can be determined by randomly extracting 20 or more high-aspect ratio pores, measuring the cumulative 80% angle values in angle-based cumulative angle distributions of the cone angles of these high-aspect ratio pores, and averaging these the cumulative 80% angle values.

In addition, regarding the catalyst coat layer in the catalyst for purification of exhaust gas of the present invention, the wording "consisting of catalyst particles" means that the catalyst coat layer is constituted of only the catalyst particles, or the catalyst coat layer is mainly constituted of the catalyst particles and contains other components, as long as an effect of the present invention is not impaired. As the other components, it is possible to use other metal oxides, additives, and the like used for a catalyst coat layer of this type of intended purpose. Specifically, the other components may be one or more of alkali metals such as potassium (K), sodium (Na), lithium (Li), and cesium (Cs), alkaline earth metals such as barium (Ba), calcium (Ca), and strontium (Sr), rare-earth elements such as lanthanum (La), yttrium (Y), and cerium (Ce), transition metals such as iron (Fe), and the like.

(Catalyst for Purification of Exhaust Gas)

The catalyst for purification of exhaust gas of the present invention comprises: the above-described substrate; and the above-described catalyst coat layer which is formed on a surface of the substrate and which comprises the catalyst particles. Note that the catalyst for purification of exhaust gas of the present invention may be used in combination with another catalyst. The other catalyst is not particularly limited, and it is possible to use a known catalyst (for example, in the case of a catalyst for purification of automotive exhaust gas, an oxidation catalyst, a NOx reduction catalyst, a NOx storage reduction-type catalyst (NSR catalyst), a lean NOx trap catalyst (LNT catalyst), a NOx selective reduction catalyst (SCR catalyst), or the like), as appropriate.

[Method for Producing Catalyst for Purification of Exhaust Gas]

Next, a method for producing a catalyst for purification of exhaust gas of the present invention is described. The method for producing a catalyst for purification of exhaust gas of the present invention comprises:

a step of obtaining a catalyst slurry (catalyst slurry preparation step) of mixing metal oxide particles having a cumulative 50% diameter value in a range of 3 to 10 μm in a volume-based cumulative particle size distribution measured by laser diffractometry, a noble metal raw material, and a fibrous organic material having an average fiber diameter in a range of 1.7 to 8.0 μm and having an average aspect ratio in a range of 9 to 40 such that an amount of the fibrous organic material is in a range of 0.5 to 9.0 parts by mass relative to 100 parts by mass of the metal oxide particles;

a step of forming a catalyst slurry layer (catalyst slurry layer formation step) of applying the catalyst slurry onto a surface of a substrate such that a catalyst coat layer after calcination has an average thickness in a range of 25 to 160 μm; and a calcination step (calcination step) of removing at least part of the fibrous organic material in the catalyst slurry layer to obtain the catalyst for purification of exhaust gas. This method makes it possible to produce a catalyst for purification of exhaust gas capable of exhibiting an excellent catalyst performance also in a high-load region with a high gas flow rate.

(Oxide Particle Preparation Step)

In the method for producing a catalyst for purification of exhaust gas of the present invention, first, metal oxide particles are prepared which has a cumulative 50% diameter value in a range of 3 to 10 μm in a volume-based cumulative particle size distribution measured by laser diffractometry (oxide particle preparation step).

As the metal oxide particles prepared in the oxide particle preparation step, the same catalyst substrate particles (oxide particles) as those for the catalyst particles described for the catalyst coat layer in the above-described catalyst for purification of exhaust gas of the present invention are used. Note that a method for preparing the metal oxide particles prepared in the oxide particle preparation step is not particularly limited, and a known method can be employed, as appropriate. In addition, commercially available ones may also be used as the metal oxide particles. The forms of the metal oxide particles prepared in the oxide particle preparation step of the present invention include metal oxide particles (including composite oxide particles) prepared by a known method, commercially available metal oxide particles (including composite oxide particles), mixtures thereof, dispersions obtained by dispersing any of these particles in a solvent such as ion-exchanged water or the like, and the like.

The particle diameters of the metal oxide particles used in the oxide particle preparation step according to the production method of the present invention have to be such that the cumulative 50% diameter value in a volume-based cumulative particle size distribution measured by laser diffractometry is in a range of 3 to 10 μm. If the particle diameter (volume-based cumulative 50% diameter value) of the metal oxide particles is less than the lower limit, the particle diameter (cross-sectional area-based cumulative 15% diameter value) of the catalyst particles of the catalyst coat layer in the obtained catalyst for purification of exhaust gas is excessively small, which causes decrease in the void fraction of the catalyst coat layer and deterioration in the gas diffusibility, so that the obtained catalytic performance such as NOx purification performance is insufficient. Meanwhile, if the particle diameter exceeds the upper limit, the particle diameter (cross-sectional area-based cumulative 15% diameter value) of the catalyst particles of the catalyst coat layer in the obtained catalyst for purification of exhaust gas is excessively large, which increases the gas diffusion resistance inside the catalyst particles, so that the obtained catalytic performance such as NOx purification performance is insufficient. Furthermore, the particle diameter of the metal oxide particles is such that the volume-based cumulative 50% diameter value is preferably in a range of 3 to 9 μm, and particularly preferably in a range of 3 to 7 μm, from the viewpoint of the balance among the coatability, the diffusion resistance in the catalyst particles, and the catalytic performance.

Note that the particle diameter (volume-based cumulative 50% diameter value) of the metal oxide particles can be determined by laser diffractometry. Specifically, for example, by laser diffractometry using a laser diffractometer such as a laser diffraction-type particle size distribution measuring apparatus, the measurement is performed for randomly extracted (randomly selected) 1000 or more metal oxide particles, and the cumulative 50% diameter value is calculated in a volume-based cumulative particle size distribution of the metal oxide particles. Here, the volume-based cumulative 50% diameter of metal oxide particles means the particle diameter of a metal oxide particle such that, when the metal oxide particles is counted from the metal oxide particle with the smallest size (area) among the metal oxide particles, the number of metal oxide particles reaches 50% of the total number of metal oxide particles (the volume-based cumulative frequency reaches 50%). Furthermore, when the cross-section is not circular, a particle diameter refers to a diameter of a smallest circumcircle.

A method for preparing the metal oxide particles having such a particle diameter (volume-based cumulative 50% diameter value) is not particularly limited, and may be, for example, a method in which, first, a raw material of the metal oxide particles such as a metal oxide particle powder is prepared; next, the metal oxide particle powder or the like is mixed with a solvent such as ion-exchanged water, or the like; and then the metal oxide particle powder or the like is dispersed in the solvent such as water by stirring the obtained solution using a mediated mill such as a bead mill, other stirring type pulverizer, or the like to adjust the particle diameter of the metal oxide particles to a predetermined value. Note that stirring conditions in a case where a mediated mill such as a bead mill is used are not particularly limited, and are preferably such that the diameters of beads are in a range of 100 to 5000 μm, the treatment time is in a range of 3 minutes to 1 hours, and the stirring speed is in a range of 50 to 500 rpm.

(Catalyst Slurry Preparation Step)

Next, in the method for producing a catalyst for purification of exhaust gas of the present invention, a catalyst slurry is obtained by mixing the metal oxide particles, a noble metal raw material, and a fibrous organic material having an average fiber diameter in a range of 1.7 to 8.0 μm and having an average aspect ratio in a range of 9 to 40, such that an amount of the fibrous organic material is in a range of 0.5 to 9.0 parts by mass relative to 100 parts by mass of the metal oxide particles (catalyst slurry preparation step).

The noble metal raw material used in the catalyst slurry preparation step according to the production method of the present invention is not particularly limited, and may be, for example, a solution in which a salt (for example, acetic acid salt, carbonic acid salt, nitric acid salt, ammonium salt, citric acid salt, dinitro diammine salt, or the like) of a noble metal (for example, Pt, Rh, Pd, Ru, or the like, or a compound thereof), a complex thereof (for example, a tetraamine complex) is dissolved in a solvent such as water, an alcohol, or the like. In addition, the amount of the noble metal is not particularly limited, and the noble metal may be supported in a necessary amount, as appropriate, according to the intended design or the like. The amount of the noble metal is preferably 0.01% by mass or more. Note that when platinum is used as the noble metal, examples of platinum salts include, but are not particularly limited to, acetic acid salt, carbonic acid salt, nitric acid salt, ammonium salt, citric acid salt, dinitro diammine salt, or the like of platinum (Pt), or complexes thereof. Especially, a dinitro diammine salt is preferable from the viewpoints of ease of supporting and high dispersibility. Meanwhile, when palladium is used as the noble metal, examples of palladium salts include, but are not particularly limited to, solutions of acetic acid salt, carbonic acid salt, nitric acid salt, ammonium salt, citric acid salt, dinitro diammine salt, or the like of palladium (Pd), and complexes thereof. Especially, nitric acid salt or dinitro diammine salt is preferable from the viewpoints of ease of supporting and high dispersibility. Moreover, the solvent is not particularly limited, and examples thereof include solvents capable of dissolving the noble metal raw material in the form of ions, such as water (preferably pure water such as ion-exchanged water or distilled water).

In addition, the fibrous organic material used in the catalyst slurry preparation step is not particularly limited, as long as the substance can be removed in the calcination step described later. Examples of the fibrous organic material include polyethylene terephthalate (PET) fibers, acrylic fibers, nylon fibers, rayon fibers, and cellulose fibers. Of these fibers, it is preferable to use at least one selected from the group consisting of PET fibers and nylon fibers from the viewpoint of the balance between the processability and the calcination temperature. Causing the catalyst slurry to comprise the fibrous organic material and removing at least part of the fibrous organic material in the subsequent step make it possible to form voids having shapes which are the same as the shapes of the fibrous organic material in the catalyst coat layer. The thus prepared voids serve as diffusion flow paths for exhaust gas, so that an excellent catalyst performance can be exhibited also in a high-load region with a high gas flow rate.

The fibrous organic material used in the catalyst slurry preparation step has to have an average fiber diameter in a range of 1.7 to 8.0 µm. If the average fiber diameter of the fibrous organic material is less than the lower limit, pores having effectively high aspect ratios cannot be obtained, so that the catalytic performance is insufficient. Meanwhile, if the average fiber diameter exceeds the upper limit, the increase in thickness of the catalyst coat layer increases the pressure drop, causing deterioration in fuel-efficiency. Furthermore, the average fiber diameter of the fibrous organic material is preferably in a range of 2.0 to 6.0 µm, and particularly preferably in a range of 2.0 to 5.0 µm, from the viewpoint of the balance between the catalytic performance and the coat thickness.

In addition, the fibrous organic material used in the catalyst slurry preparation step has to have an average aspect ratio in a range of 9 to 40. If the average aspect ratio is less than the lower limit, the connectivity of the pores is so insufficient that the gas diffusibility is insufficient. Meanwhile, if the average aspect ratio exceeds the upper limit, the excessively high diffusibility increases the ratio of gas passing through the coat layer without contact with any active sites of the catalyst, so that the obtained catalytic performance is insufficient. Furthermore, the average aspect ratio of the fibrous organic material is preferably in a range of 9 to 30, and particularly preferably in a range of 9 to 28, from the viewpoint of the balance between the gas diffusibility and the catalytic performance. Note that the average aspect of the fibrous organic material is defined as "average fiber length/average fiber diameter." Here, the fiber length is the distance of a straight line connecting between the starting point and the end point of a fiber. The average fiber length can be determined by randomly extracting 50 or more pieces of the fibrous organic material, measuring the fiber lengths of these pieces of the fibrous organic material, and averaging the fiber lengths. Meanwhile, the average fiber diameter can be determined by randomly extracting 50 or more pieces of the fibrous organic material, measuring the fiber diameters of these pieces of the fibrous organic material, and averaging the fiber diameters.

Moreover, the amount of the fibrous organic material mixed used in the catalyst slurry preparation step has to be in a range of 0.5 to 9.0 parts by mass, relative to 100 parts by mass of the metal oxide particles. If the amount of the fibrous organic material mixed is less than the lower limit, a sufficient pore connectivity cannot be obtained, resulting in an insufficient catalytic performance. Meanwhile, if the amount of the fibrous organic material mixed exceeds the upper limit, the increase in thickness of the catalyst coat layer increases the pressure drop, causing deterioration in fuel-efficiency. Furthermore, from the viewpoint of the balance between the catalytic performance and the pressure drop, the amount of the fibrous organic material mixed is preferably in a range of 0.5 to 8.0 parts by mass, and particularly preferably in a range of 1.0 to 5.0 parts by mass, relative to 100 parts by mass of the metal oxide particles.

In addition, the amount of the fibrous organic material mixed used in the catalyst slurry preparation step is preferably 80% by mass or more and more preferably 90% by mass or more of the total amount of solid organic material added to the catalyst slurry. It is particularly preferable that all of the solid organic material added to the catalyst slurry be the fibrous organic material (100% by mass). If the ratio of the fibrous organic material mixed relative to the whole solid organic material is less than the lower limit, the formation of high-aspect ratio pores tends to be insufficient, resulting in an insufficient catalytic performance.

Moreover, the fibrous organic material used in the catalyst slurry preparation step more preferably has an average fiber diameter in a range of 2.0 to 6.0 µm and an average aspect ratio in a range of 9 to 30.

Meanwhile, a method for preparing the catalyst slurry in the catalyst slurry preparation step is not particularly limited, and a known method can be employed, as appropriate, as long as the metal oxide particles, the noble metal raw material, and the fibrous organic material are mixed together. Note that conditions for this mixing are not particularly limited, and are, for example, preferably such that the stirring speed is in a range of 100 to 400 rpm, and the treatment time is 30 minutes or more. The conditions may be any, as long as the fibrous organic material can be uniformly mixed and dispersed in the catalyst slurry. In addition, the mixing order is not particularly limited, and any one of the following methods may be employed: a method in which the noble metal raw material is mixed with a dispersion containing the metal oxide particles to support the noble metal thereon, and then the fibrous organic material is mixed; a method in which the fibrous organic material is mixed with a dispersion containing the metal oxide particles, and then the noble metal raw material is mixed; a method in which the noble metal raw material and the fibrous organic material are simultaneously mixed with a dispersion containing the metal oxide particles; a method in which the metal oxide particles and the fibrous organic material are mixed with a solution containing the noble metal raw material; and the like. The treatment conditions are not particularly limited, and are selected, as appropriate, according to the intended design of the catalyst for purification of exhaust gas and the like.

(Catalyst Slurry Layer Formation Step)

In the method for producing a catalyst for purification of exhaust gas of the present invention, subsequently, the catalyst slurry is applied onto a surface of a substrate to form a catalyst slurry layer (catalyst slurry layer formation step).

The average thickness of the catalyst coat layer in the catalyst slurry layer formation step has to be such that the average thickness of the catalyst coat layer after calcination is in a range of 25 to 160 µm, preferably in a range of 30 to 96 µm, and particularly preferably in a range of 32 to 92 µm.

In addition, the coating amount of the catalyst coat layer in the catalyst slurry layer formation step is preferably such that the coating amount of the catalyst coat layer after calcination is in a range of 50 to 300 g/L, more preferably in a range of 50 to 250 g/L, and particularly preferably in a range of 50 to 200 g/L per unit volume of the substrate.

The substrate used in the catalyst slurry layer formation step is not particularly limited, and it is possible to use, for example, the same substrate as that described above for the substrate in the catalyst for purification of exhaust gas of the present invention.

In addition, a method for applying the catalyst slurry onto the surface of the substrate is not particularly limited, and a known method can be employed, as appropriate. Specifically, the method may be a method in which the substrate is immersed in the catalyst slurry to apply the catalyst slurry thereon (immersion method), a wash-coating method, a method in which the catalyst slurry is intruded by intruding means, or the like. Note that, regarding the conditions for the application, the catalyst slurry has to be applied onto the surface of the substrate such that the average thickness of the catalyst coat layer after calcination in a range of 25 to 160 μm.

(Calcination Step)

In the method for producing a catalyst for purification of exhaust gas of the present invention, next, at least part of the fibrous organic material in the catalyst slurry layer is removed to obtain the above-described catalyst for purification of exhaust gas of the present invention (calcination step).

In the calcination step according to the method for producing a catalyst for purification of exhaust gas of the present invention, the substrate (catalyst slurry layer-supporting substrate) on which the catalyst slurry layer has been formed is preferably calcined at a temperature in a range of 300 to 800° C. and more preferably calcined at a temperature in a range of 400 to 700° C. If the calcination temperature is lower than the lower limit, the fibrous organic material tends to remain. Meanwhile, if the calcination temperature exceeds the upper limit, the noble metal particles tend to be sintered. In addition, the calcination (heating) time cannot be generally specified because it varies depending on the calcination temperature; however, the calcination time is preferably 20 minutes or more, and more preferably 30 minutes to 2 hours. Moreover, an atmosphere in the calcination step is not particularly limited, and the calcination step is preferably performed in air or in an inert gas such as nitrogen ($N_2$).

[Method for Purification of Exhaust Gas]

Next, a method for purification of exhaust gas of the present invention is described. The method for purification of exhaust gas of the present invention comprises: bringing exhaust gas emitted from an internal combustion engine into contact with the above-described catalyst for purification of exhaust gas of the present invention to purify the exhaust gas.

In the method for purification of exhaust gas of the present invention, a method for bringing exhaust gas into contact with the catalyst for purification of exhaust gas is not particularly limited, and a known method can be employed, as appropriate. For example, it is possible to employ a method in which the above-described catalyst for purification of exhaust gas according to the present invention is disposed in an exhaust pipe through which gas emitted from an internal combustion engine flows to bring the exhaust gas from the internal combustion engine into contact with the catalyst for purification of exhaust gas.

Note that since the catalyst for purification of exhaust gas of the present invention used in the method for purification of exhaust gas of the present invention exhibits an excellent catalyst performance also in a high-load region with a high gas flow rate, bringing exhaust gas emitted from, for example, an internal combustion engine of an automobile or the like into contact with the above-described catalyst for purification of exhaust gas of the present invention makes it possible to purify the exhaust gas also in a high-load region with a high gas flow rate. From such a viewpoint, the method for purification of exhaust gas of the present invention can be employed preferably as a method for removal of harmful components such as harmful gases (hydrocarbons (HC), carbon monoxide (CO), nitrogen oxides (NOx)) in exhaust gas emitted from an internal combustion engine of, for example, an automobile or the like, or as the like.

EXAMPLES

Hereinafter, the present invention is described more specifically on the basis of Examples and Comparative Examples; however, the present invention is not limited to Examples below.

Example 1

First, to 500 g of ion-exchanged water, 150 g of an $Al_2O_3$ powder (manufactured by Sasol Limited; specific surface area: 100 $m^2$/g, average particle diameter: 30 μm) and 300 g of a $CeO_2$—$ZrO_2$ solid solution powder (manufactured by Daiichi Kigenso Kagaku Kogyo Co., Ltd.; $CeO_2$ content: 20% by mass, $ZrO_2$ content: 25% by mass, specific surface area: 100 $m^2$/g, average particle diameter: 10 nm) were added and mixed together. The obtained solution was subjected to a stirring treatment by using a bead mill (manufactured by AS ONE Corporation under the trade name of "ALUMINA BALL", beads used: alumina micro beads having a diameter of 5000 μm) under conditions of a treatment time of 25 minutes and a stirring speed of 400 rpm to prepare a dispersion containing metal oxide particles consisting of a mixture (composite metal oxide) of the $CeO_2$—$ZrO_2$ solid solution and the $Al_2O_3$ powder. Note that the particle diameter of the metal oxide particles was measured by laser diffractometry using a laser diffraction-type particle size distribution-measuring apparatus (manufactured by HORIBA, Ltd. under the trade name of "LA-920"), and the cumulative 50% diameter value in an area-based cumulative particle size distribution was 3.2 μm.

Next, to the obtained dispersion, 0.05 L of a dinitrodiammineplatinum solution containing 4 g of platinum (Pt) in terms of metal as a noble metal raw material and an organic fiber (PET fiber, average diameter: 3 μm×length: 42 μm, average aspect ratio: 14) as a fibrous organic material in an amount of 1.0 parts by mass of relative to 100 parts by mass of the metal oxide particles were added, followed by mixing under a condition of a stirring speed of 400 rpm for 30 minutes to prepare a catalyst slurry.

Subsequently, the obtained catalyst slurry was applied by wash-coating onto a hexagonal-cell cordierite monolithic honeycomb substrate (manufactured by DENSO CORPORATION under the trade name of "D60H/3-9R-08EK", diameter: 103 mm, length: 105 mm, volume: 875 ml, cell density: 600 cell/$inch^2$) serving as a substrate, followed by drying under a temperature condition of 100° C. in air for 0.5 hours. Then, the wash-coating, drying, and preliminary calcination of the catalyst slurry were further performed repeatedly, until the coating amount of the catalyst slurry on the substrate reached 100 g per 1 L of the substrate (100 g/L). Thus, a catalyst slurry layer was formed on the substrate.

After that, the catalyst slurry layer was calcined under a temperature condition of 500° C. in air for 2 hours to obtain a catalyst for purification of exhaust gas (catalyst sample) in which the catalyst coat layer made of the catalyst particles was formed on the substrate surface of the honeycomb-shaped cordierite monolithic substrate.

Note that Table 1 shows the treatment time [minutes] of the stirring treatment in the oxide particle preparation step, the particle diameter (volume-based cumulative 50% diameter value) [μm] of the obtained metal oxide particles, the raw material species, the average fiber diameter [μm], the average aspect ratio, and the mixed amount [parts by mass] of the fibrous organic material used in the catalyst slurry preparation step, and the coating amount [g/L] of the catalyst coat layer.

Examples 2 to 42

Each catalyst slurry was obtained in the same manner as in Example 1, except that the treatment time using the bead mill was set as shown in Tables 1 to 5, the stirring treatment was performed using the bead mill such that the particle diameter of the metal oxide particles took the value shown in Tables 1 to 5 in terms of the cumulative 50% diameter value in a volume-based cumulative particle size distribution, and the fibrous organic material with the raw material species, the average fiber diameter, the average aspect ratio, and the mixed amount shown in Tables 1 to 5 was used. Next, the obtained catalyst slurry was applied onto (used to coat) a cordierite monolithic honeycomb substrate and calcined in the same manner as in Example 1 to obtain each catalyst for purification of exhaust gas (catalyst sample).

Note that the fibrous organic material used in Examples 31 to 39 was prepared as follows. Specifically, titanium isopropoxide (Ti(OPr$^i$)$_4$), polyethylene glycol (PEG), and polymethyl methacrylate resin (PMMA) particles (average diameter: 3 μm) were added to isopropanol, and the mixture was injected into distilled water to prepare an organic fiber in a predetermined shape.

Furthermore, Tables 1 to 5 show the treatment time [minutes] of the stirring treatment and the particle diameter (volume-based cumulative 50% diameter value) [μm] of the obtained metal oxide particles in the oxide particle preparation step, and the raw material species, the average fiber diameter [μm], the average aspect ratio, and the mixed amount [parts by mass] of the fibrous organic material used in the catalyst slurry preparation step, and the coating amount [g/L] of the catalyst coat layer.

Comparative Examples 1 to 7

Each catalyst slurry for comparison was obtained in the same manner as in Example 1, except that the treatment time using the bead mill was set as shown in Table 6, the stirring treatment was performed using the bead mill such that the particle diameter of the metal oxide particles took the value shown in Table 6 in terms of the cumulative 50% diameter value in a volume-based cumulative particle size distribution, and no solid organic material (fibrous organic material) was used. Next, the obtained catalyst slurry for comparison was applied onto (used to coat) a cordierite monolithic honeycomb substrate and calcined in the same manner as in Example 1. Thus, each catalyst for purification of exhaust gas for comparison (catalyst sample for comparison) was obtained.

Note that Table 6 shows the treatment time [minutes] of the stirring treatment and the particle diameter (volume-based cumulative 50% diameter value) [μm] of the obtained metal oxide particles in the oxide particle preparation step, and the coating amount [g/L] of the catalyst coat layer.

Comparative Examples 8 to 127

Each catalyst slurry for comparison was obtained in the same manner as in Example 1, except that the treatment time using the bead mill was set as shown in Tables 7 to 22, the stirring treatment was performed using the bead mill such that the particle diameter of the metal oxide particles took the value shown in Tables 7 to 22 in terms of the cumulative 50% diameter value in a volume-based cumulative particle size distribution, a fibrous organic material or a solid organic material with the raw material species, the average fiber diameter or average diameter, the average aspect ratio, and the mixed amount shown in Tables 7 to 22 was used. Next, the obtained catalyst slurry for comparison was applied onto (used to coat) a cordierite monolithic honeycomb substrate and calcined in the same manner as in Example 1. Thus, each catalyst for purification of exhaust gas for comparison (catalyst sample for comparison) was obtained.

Note that the solid organic material (fibrous organic material) used in Comparative Examples 122 to 125 was prepared as follows. Specifically, titanium isopropoxide (Ti(OPr$^i$)$_4$), polyethylene glycol (PEG), and polymethyl methacrylate resin (PMMA) particles (average diameter: 3 μm) were added to isopropanol, and the mixture was injected into distilled water to prepare an organic fiber in a predetermined shape.

Furthermore, Tables 7 to 22 show the treatment time [minutes] of the stirring treatment and the particle diameter (volume-based cumulative 50% diameter value) [μm] of the obtained metal oxide particles in the oxide particle preparation step, the raw material species, the average fiber diameter or average diameter [μm], the average aspect ratio, and the mixed amount [parts by mass] of the fibrous organic material or solid organic material used in the catalyst slurry preparation step, and the coating amount [g/L] of the catalyst coat layer.

The catalysts for purification of exhaust gas (catalyst samples) obtained in Examples 1 to 42 and the catalysts for purification of exhaust gas for comparison (catalyst samples for comparison) obtained in Comparative Examples 1 to 127 were each measured for the average thickness [μm] of the catalyst coat layer, the particle diameter (cross-sectional area-based cumulative 15% diameter value) [μm] of the catalyst particles, the void fraction [% by volume] of the catalyst coat layer, the average aspect ratio of the high-aspect ratio pores, the ratio [%] of the high-aspect ratio pores relative to all the voids, and the orientation angle (cumulative 80% angle value) [degrees (°)] of the high-aspect ratio pores, and the pore diameter distribution of the catalyst coat layer.

(Test for Measuring Average Thickness of Catalyst Coat Layer)

Each of the catalyst samples and the catalyst samples for comparison was embedded in an epoxy resin and cut in the radial direction of the substrate (honeycomb-shaped substrate), and the cross-section was polished. This sample was measured for the average thickness of the catalyst coat layer under scanning electron microscopic (SEM) observation (magnification: 700 fold). Note that the average thickness was determined by randomly extracting 10 sites of the catalyst coat layer, measuring the layer thicknesses of the catalyst coat layer at these sites, and averaging these layer thicknesses. Tables 1 to 22 show the obtained results.

(Test for Measuring Particle Diameter of Catalyst Particles)

Each of the catalyst samples and the catalyst samples for comparison was embedded in an epoxy resin and cut in the radial direction of the substrate (honeycomb-shaped substrate), and the cross-section was polished. This sample was measured under scanning electron microscopic (SEM) observation (magnification: 700 fold), and the cumulative 15% diameter value was calculated in a cross-sectional area-based cumulative particle size distribution of the catalyst particles. Note that the cross area-based cumulative 15% diameter value of the particle diameter of catalyst particles was determined as follows. Specifically, catalyst particles were extracted from a quadrilateral region of the catalyst coat layer extending over 200 μm or more in the horizontal direction to the flat portion of the substrate and 25 μm or more in the direction perpendicular to the flat portion of the substrate. Then, the cross-sectional area-based cumulative 15% diameter value of the particle diameter of catalyst particles was determined by measuring the particle diameter value of the catalyst particle such that, when the cross-sectional areas of these catalyst particles were counted from the largest catalyst particle size (cross-sectional area) among those of these catalyst particles, the sum of the cross-sectional areas of the catalyst particles reached 15% of all the cross-sectional areas of the catalyst coat layer except for those of pores having cross-sectional areas of less than 0.3 μm$^2$. Tables 1 to 22 show the obtained results.

(Test for Measuring Void Fraction of Catalyst Coat Layer)

The void fraction of the catalyst coat layer of each of the catalyst samples and the catalyst samples for comparison was determined by using the following formula by a weight-in-water method according to JIS R 2205. Note that the degassing was vacuum degassing.

Void fraction(porosity)(% by volume)=$(W3-W1)/(W3-W2)\times 100$

W1: dry mass (120° C.×60 minutes)
W2: mass-in-water
W3: water-saturated mass

Tables 1 to 22 show the obtained results.

(Test 1 for Measuring Pores in Catalyst Coat Layer: Equivalent Circle Diameter of Pore)

Pores in the catalyst coat layer of each of the catalyst samples and the catalyst samples for comparison were analyzed by FIB-SEM.

Figure 4:
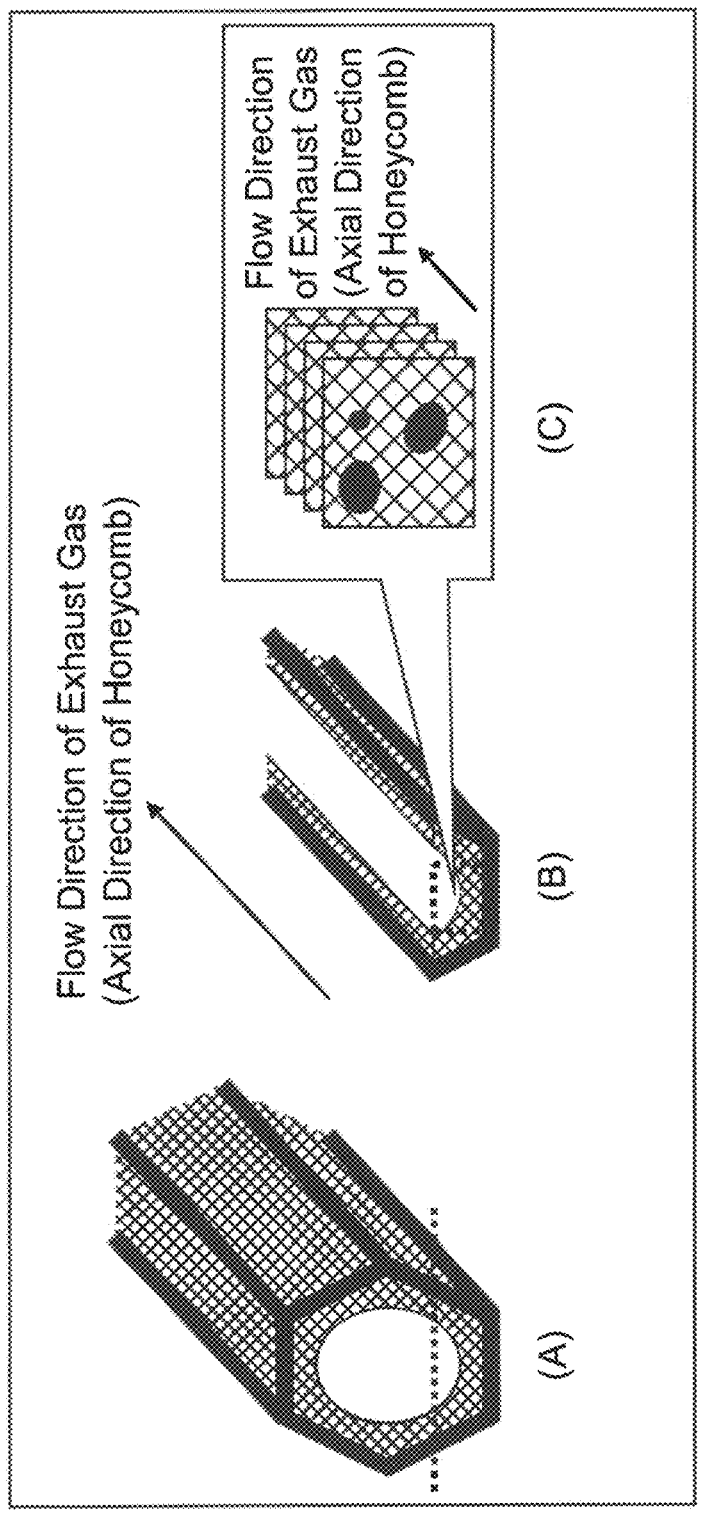
FIG. 4 is a schematic diagram showing an example of a FIB-SEM measurement method, where part (A) is a schematic diagram showing part of a cross-section of a catalyst coat layer which the cross-section is perpendicular to a flow direction of exhaust gas in a substrate of a catalyst for purification of exhaust gas of the present invention; part (B) is a schematic diagram showing a test piece obtained by cutting the catalyst for purification of exhaust gas in an axial direction at the position of the dotted line shown in part (A); and part (C) is a schematic diagram of SEM images obtained by the FIB-SEM measurement method.
Figure 5:
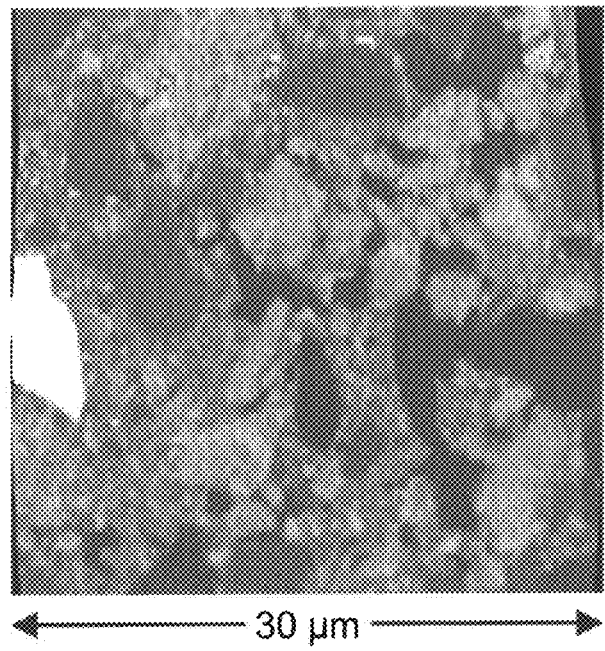
FIG. 5 is a scanning electron micrograph (SEM photograph) of a cross-section of a catalyst coat layer which the cross-section is perpendicular to a flow direction of exhaust gas in a substrate of a catalyst for purification of exhaust gas obtained in Example 5.

First, each of the catalyst samples and the catalyst samples for comparison was cut in the axial direction at the position of the dotted line shown in part (A) of FIG. 4 to obtain a test piece having the shape shown in part (B) of FIG. 4. Next, while the test piece was being shaved off with an FIB (focused ion beam processing apparatus manufactured by Hitachi High-Technologies Corporation under the trade name of "NB5000"), SEM (scanning electron microscope manufactured by Hitachi High-Technologies Corporation under the trade name of "NB5000") images were taken at a pitch of 0.28 μm in the depth direction as shown in part (C) of FIG. 4 in the range shown by the rectangular frame-shaped dotted line in part (B) of FIG. 4. Note that the conditions for the FIB-SEM analysis were such that each SEM image was 25 μm or more in length and 500 μm or more in width, the measurement depth was 500 μm or more, the number of visual fields captured was 3 or more, and the imaging magnification was 2000 fold. FIG. 4 is a schematic diagram showing an example of the FIB-SEM measurement method, where part (A) is a schematic diagram showing part of a cross-section of a catalyst coat layer which the cross-section was perpendicular to a flow direction of exhaust gas in a substrate of a catalyst for purification of exhaust gas of the present invention, part (B) is a schematic diagram showing a test piece obtained by cutting the catalyst for purification of exhaust gas in the axial direction at the position of the dotted line shown in part (A), and part (C) shows a schematic diagram of SEM images obtained by the FIB-SEM measurement method. As an example of the observation results by the FIB-SEM analysis, FIG. 5 shows one of the consecutive cross-sectional SEM images obtained by measuring the catalyst sample of Example 5. The black portions in FIG. 5 are pores. FIG. 5 is a scanning electron micrograph (SEM photograph) of a cross-section of a catalyst coat layer which the cross-section was perpendicular to a flow direction of exhaust gas in the substrate of the catalyst for purification of exhaust gas obtained in Example 5. Note that the consecutive images as shown in part (C) of FIG. 4 can also be taken by X-ray CT or the like.

Figure 6:
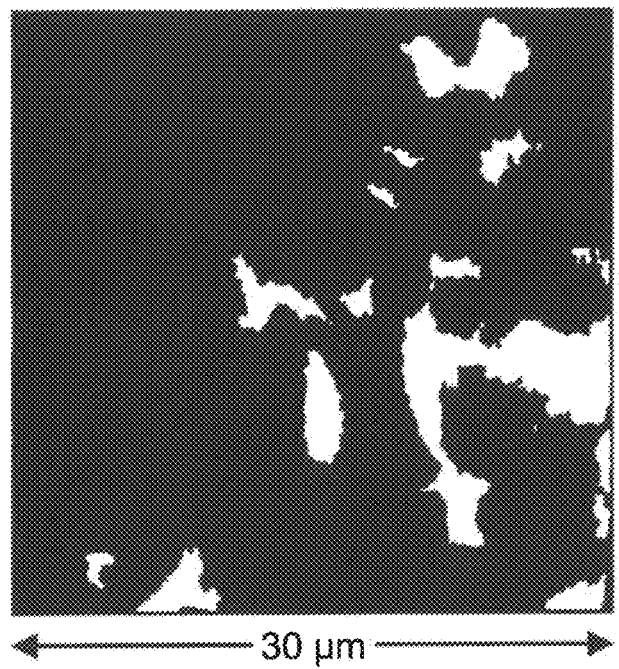
FIG. 6 is an image obtained by binarizing the SEM photograph of FIG. 5.

Next, the consecutive cross-sectional images (SEM images) obtained by the FIB-SEM analysis were subjected to an image analysis based on the difference in luminance between pores and the catalyst by using commercially available image analysis software (manufactured by Mitani Corporation, "two-dimensional image analysis software WinROOF"), and pores were extracted by binarization processing. As an example of the obtained results, FIG. 6 shows a binarized version of the SEM photograph of FIG. 5. In FIG. 6, the black portion represents the catalyst, and the white portions represent pores. Note that, regarding the analysis of the pores, pores having equivalent circle diameters of 2 μm or more in the cross-sectional image of each cross-section of the catalyst coat layer which the cross-section was perpendicular to the flow direction of exhaust gas in the substrate were subjected to the analysis. In addition, the function of extracting the subject by utilizing the difference in luminance is not limited to that of WinROOF, but it is possible to use a function contained as a standard function in commonly-used analysis software (for example, image-Pro Plus manufactured by Planetron).

By this image analysis, the area within the contour of each pore was determined, and the equivalent circle diameter of the pore was calculated. Thus, the equivalent circle diameter was obtained as the particle diameter of the pore.

(Test 2 for Measuring Pores in Catalyst Coat Layer: Average Aspect Ratio of High-Aspect Ratio Pores)

Next, the consecutive cross-sectional images obtained by the above-described method were analyzed, and three-dimensional information about pores was extracted. Here, the method for measuring the average aspect ratio of high-aspect ratio pores was the same as that described above by using FIGS. 1 and 2, and the average aspect ratio of the high-aspect ratio pores was determined by creating two-dimensional projections illustrating three-dimensional information about each pore and cross-sectional images of the pore, which correspond to FIGS. 1 and 2 described above, and analyzing high-aspect ratio pores in an area of 25 μm or more in length and 500 μm or more in width of the SEM image and in a measurement depth of 500 μm or more (the number of visual fields captured was 3 or more, and the imaging magnification was 2000 fold). Note that the two-dimensional projection illustrating three-dimensional information about pores obtained by analyzing the consecutive cross-sectional images of cross-sections of the catalyst coat layer which the cross-section were perpendicular to the flow direction of exhaust gas in the substrate of the catalyst for purification of exhaust gas obtained in Example 5 was similar to the above-described two-dimensional projection illustrating three-dimensional information about a pore shown in FIG. 1. As a result, the average aspect ratio of the high-aspect ratio pores was found to be 18.9 in Example 5. In addition, Tables 1 to 22 show the measurement results (the average aspect ratios of the high-aspect ratio pores) of Examples other than Example 5 and of Comparative Examples.

(Test 3 for Measuring Pores in Catalyst Coat Layer: Ratio of High-Aspect Ratio Pores Relative to all Voids)

Next, the ratio of the high-aspect ratio pores relative to all the voids was determined by dividing the void fraction of the high-aspect ratio pores by the void fraction of the catalyst coat layer.

Note that, for the void fraction (% by volume) of the high-aspect ratio pores, first, high-aspect ratio pores in an area of 25 μm or more in length and 500 μm or more in width of the SEM image and in a measurement depth of 500 μm or more (the number of visual fields captured was 3 or more and the imaging magnification was 2000 fold) were extracted, and the volume of each of the high-aspect ratio pores was calculated by the method shown below. Specifically, the volumes of the high-aspect ratio pores were calculated by multiplying the areas of cross-sections of the high-aspect ratio pore in the cross-sectional images obtained by FIB-SEM by the pitch (0.28 μm) of the consecutive cross-sectional images, and adding up these values. Next, the obtained values of the "volumes of the high-aspect ratio pores" are divided by the volume of the range (the range of the SEM images) where the FIB-SEM images were taken to obtain the void fraction (% by volume) of the high-aspect ratio pores.

Next, the obtained void fraction (% by volume) of the high-aspect ratio pores was divided by the void fraction (% by volume) of the catalyst coat layer obtained in the above-described "Test for Measuring Void Fraction of Catalyst Coat Layer" to determine the ratio (% by volume) of the high-aspect ratio pores relative to all the voids ("ratio (%) of high-aspect ratio pores relative to all voids"="void fraction (% by volume) of high-aspect ratio pores"/"void fraction (% by volume) of catalyst coat layer"×100).

As a result, the ratio of the high-aspect ratio pores relative to all the voids was 11.1% by volume in Example 5. In addition, Tables 1 to 22 show the measurement results (ratio of high-aspect ratio pores relative to all voids) of Examples other than Example 5 and Comparative Examples.

(Test 4 for Measuring Pores in Catalyst Coat Layer: Orientation Angle of High-Aspect Ratio Pores)

Next, as an orientation angle of the high-aspect ratio pores, the cumulative 80% angle value was determined in an angle-based cumulative angle distribution of the angles (cone angles) each formed by the vector in the long diameter direction of each of the high-aspect ratio pores and the vector in the flow direction of exhaust gas in the substrate. Here, the method for measuring the orientation angle (cumulative 80% angle value) of the high-aspect ratio pores was the same as that described above by using FIGS. 1 to 3. Note that the two-dimensional projection obtained in Example 5 was similar to the two-dimensional projection illustrated in FIG. 1, and FIG. 3 is similar to a schematic diagram showing the cone angle of a high-aspect ratio pore in a two-dimensional projection obtained in Example 5. As shown in the schematic diagram of FIG. 3, the angle (cone angle) formed by the vector (Y) in the long diameter direction of each high-aspect ratio pore and the vector (X) in the flow direction of exhaust gas in the substrate (the axial direction of the honeycomb) was determined, and the cumulative 80% angle value in an angle-based cumulative angle distribution of the cone angles was calculated by the above-described image analysis of the three-dimensional image. Note that the orientation angle (cumulative 80% angle value) of high-aspect ratio pores was determined by randomly extracting 20 high-aspect ratio pores, measuring the cumulative 80% angle values in the angle-based cumulative angle distributions of the cone angles of these high-aspect ratio pores, and averaging the cumulative 80% angle values. Tables 1 to 22 show the obtained results (cumulative 80% angle value).

(Test for Measuring Pore Diameter Distribution of Catalyst Coat Layer)

Figure 7:
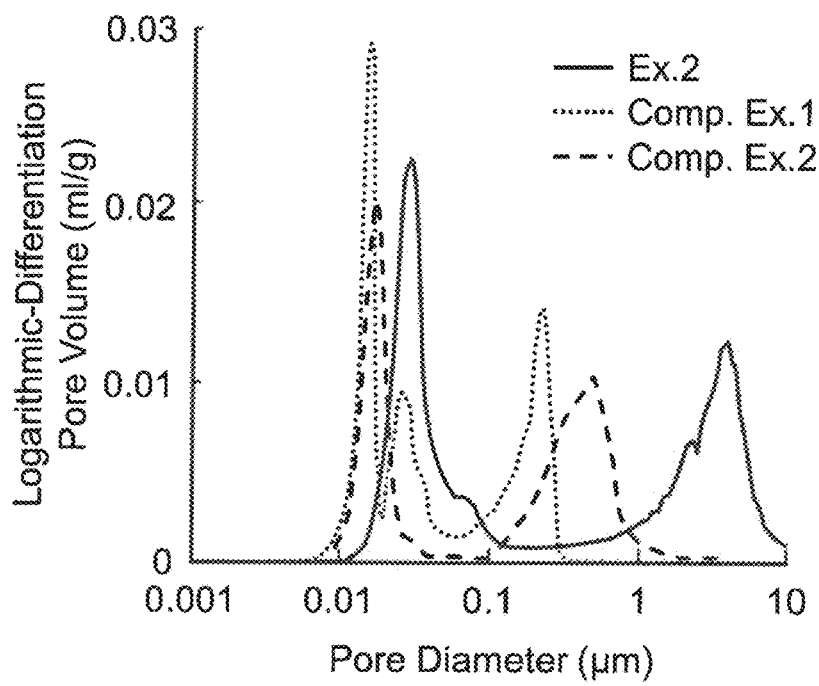
FIG. 7 is a graph showing logarithmic differential pore volume distributions of catalyst coat layers in catalysts obtained in Example 2 and Comparative Examples 1 and 2.

A logarithmic differential pore volume distribution of the catalyst coat layer of each of the catalyst samples and the catalyst samples for comparison was measured with a mercury intrusion-type porosimeter. FIG. 7 shows the obtained results. In addition, the presence of at least two peaks in the obtained logarithmic differential pore volume distribution was observed, and the modal pore diameter of the peak (primary peak) having the largest modal pore diameter among these peaks was read. Table 23 shows the obtained results.

[Characterization of Catalysts Obtained in Examples 1 to 42 and Comparative Examples 1 to 127]

<Test for Evaluating Catalytic Performance>

The catalyst samples obtained in Examples 1 to 42 and Comparative Examples 1 to 127 were each subjected to a NOx removal ratio measurement test as described below, and the catalytic performance of each catalyst was evaluated.

(Test for Measuring NOx Removal Ratio)

The catalyst samples obtained in Examples 1 to 42 and Comparative Examples 1 to 127 were each measured for the NOx removal ratio in a transient varying atmosphere during a transient period as described below.

Specifically, first, an A/F feedback control aimed at 14.1 and 15.1 was carried out by using an inline 4-cylinder 2.4 L engine, and the NOx removal ratio was calculated from the average amount of NOx emitted at the A/F switching. Here, the engine operation conditions and the set-up of the piping were adjusted such that the amount of air taken in was 40 (g/sec), and the temperature of the gas flowing into the catalyst was 750° C. Tables 1 to 22 show the obtained results (NOx removal ratio).

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Oxide particle preparation step | Stirring treatment | Treatment time [minutes] | 25 | 15 | 13 | 7 | 15 | 17 | 5 | 25 | 15 |
| | Metal oxide particles | Particle diameter of particles (Volume-based cumulative 50% diameter value) [μm] | 3.2 | 4.6 | 6.4 | 9.5 | 4.6 | 6.4 | 9.5 | 3.2 | 4.6 |
| | Fibrous organic material | Raw material species | PET fiber | PET fiber | PET fiber | PET fiber | PET fiber | PET fiber | PET fiber | PET fiber | PET fiber |
| | | Average fiber diameter or average diameter [μm] | 3.0 | 3.0 | 3.0 | 3.0 | 3.0 | 3.0 | 3.0 | 3.0 | 3.0 |

TABLE 1-continued

|  |  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
|  |  | Average aspect ratio | 14 | 14 | 14 | 14 | 14 | 14 | 14 | 14 | 14 |
|  |  | Mixed amount [parts by mass] | 1.0 | 1.0 | 1.0 | 1.0 | 2.0 | 2.0 | 2.0 | 5.0 | 5.0 |
| Catalyst coat layer |  | Coating amount [g/L] | 100 | 100 | 100 | 100 | 100 | 100 | 100 | 100 | 100 |
|  |  | Particle diameter of catalyst particles (Cross-sectional area-based cumulative 15% diameter value) [μm] | 3.4 | 5.4 | 6.9 | 9.7 | 5.4 | 6.9 | 9.7 | 3.4 | 5.4 |
|  |  | Average thickness [μm] | 32.0 | 56.2 | 69.0 | 86.5 | 52.7 | 68.2 | 88.8 | 40.4 | 58.8 |
|  |  | Void fraction [% by volume] | 51.2 | 66.8 | 73.2 | 78.6 | 64.9 | 71.7 | 77.8 | 59.0 | 68.9 |
|  | High-aspect ratio pores | Average aspect ratio | 17.6 | 19.1 | 19.8 | 21.0 | 18.9 | 20.7 | 21.4 | 20.0 | 20.4 |
|  |  | Orientation angle [degrees] | 38.1 | 41.3 | 38.6 | 42.3 | 38.4 | 39.5 | 42.1 | 40.3 | 39.3 |
|  |  | Ratio relative to all voids [% by volume] | 2.4 | 7.4 | 7.8 | 8.6 | 11.1 | 9.1 | 15.2 | 49.7 | 18.8 |
| Catalytic performance |  | NOx removal ratio [%] | 83.1 | 84.6 | 82.1 | 81.7 | 89.1 | 87.5 | 84.8 | 88.7 | 90.4 |

TABLE 2

|  |  |  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|---|
| Oxide particle preparation step | Stirring treatment | Treatment time [minutes] | 5 | 26 | 17 | 12 | 4 | 24 | 14 | 11 | 27 |
|  | Metal oxide particles | Particle diameter of particles (Volume-based cumulative 50% diameter value) [μm] | 9.5 | 3.2 | 4.6 | 6.4 | 9.5 | 3.2 | 4.6 | 6.4 | 3.2 |
| Fibrous organic material |  | Raw material species | PET fiber | PET fiber | PET fiber | PET fiber | PET fiber | PET fiber | PET fiber | PET fiber | PET fiber |
|  |  | Average fiber diameter or average diameter [μm] | 3.0 | 3.0 | 3.0 | 3.0 | 3.0 | 2.0 | 2.0 | 2.0 | 2.0 |
|  |  | Average aspect ratio | 14 | 14 | 14 | 14 | 14 | 21 | 21 | 21 | 21 |
|  |  | Mixed amount [parts by mass] | 5.0 | 7.0 | 7.0 | 7.0 | 7.0 | 3.0 | 3.0 | 3.0 | 5.0 |
| Catalyst coat layer |  | Coating amount [g/L] | 100 | 100 | 100 | 100 | 100 | 100 | 100 | 100 | 100 |
|  |  | Particle diameter of catalyst particles (Cross-sectional area-based cumulative 15% diameter value) [μm] | 9.7 | 3.4 | 5.4 | 6.9 | 10.0 | 3.4 | 5.4 | 6.9 | 3.4 |
|  |  | Average thickness [μm] | 90.3 | 37.5 | 60.6 | 70.0 | 96.1 | 33.0 | 59.0 | 65.6 | 38.0 |
|  |  | Void fraction [% by volume] | 78.8 | 56.5 | 69.7 | 72.6 | 79.5 | 53.2 | 68.7 | 70.5 | 57.2 |
|  | High-aspect ratio pores | Average aspect ratio | 22.1 | 19.9 | 21.1 | 21.3 | 21.6 | 22.7 | 23.4 | 25.5 | 26.2 |
|  |  | Orientation angle [degrees] | 43.3 | 37.5 | 38.7 | 44.4 | 41.9 | 24.7 | 25.0 | 27.7 | 24.5 |
|  |  | Ratio relative to all voids [% by volume] | 20.1 | 34.4 | 22.8 | 14.0 | 23.9 | 14.3 | 17.5 | 3.4 | 39.2 |
| Catalytic performance |  | NOx removal ratio [%] | 86.1 | 83.7 | 83.9 | 82.9 | 82.5 | 84.2 | 82.5 | 85.9 | 85.9 |

TABLE 3

|  |  |  | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|---|
| Oxide particle preparation step | Stirring treatment | Treatment time [minutes] | 15 | 12 | 24 | 19 | 13 | 6 | 24 | 16 | 6 |
|  | Metal oxide particles | Particle diameter of particles (Volume-based cumulative 50% diameter value) [μm] | 4.6 | 6.4 | 3.2 | 4.6 | 6.4 | 9.5 | 3.2 | 4.6 | 9.5 |
| Fibrous organic material |  | Raw material species | PET fiber | PET fiber | PET fiber | PET fiber | PET fiber | PET fiber | PET fiber | PET fiber | PET fiber |
|  |  | Average fiber diameter or average diameter [μm] | 2.0 | 2.0 | 5.0 | 5.0 | 5.0 | 5.0 | 5.0 | 5.0 | 5.0 |
|  |  | Average aspect ratio | 21 | 21 | 10 | 10 | 10 | 10 | 10 | 10 | 10 |
|  |  | Mixed amount [parts by mass] | 5.0 | 5.0 | 1.0 | 1.0 | 1.0 | 2.0 | 2.0 | 2.0 | 2.0 |
| Catalyst coat layer |  | Coating amount [g/L] | 100 | 100 | 100 | 100 | 100 | 100 | 100 | 100 | 100 |
|  |  | Particle diameter of catalyst particles (Cross-sectional area-based cumulative 15% diameter value) [μm] | 5.4 | 6.9 | 3.4 | 5.4 | 6.9 | 9.7 | 3.4 | 6.9 | 9.7 |
|  |  | Average thickness [μm] | 62.6 | 68.7 | 30.5 | 49.5 | 63.2 | 85.0 | 31.5 | 65.2 | 84.7 |
|  |  | Void fraction [% by volume] | 70.5 | 72.5 | 50.9 | 65.1 | 71.1 | 76.9 | 52.8 | 70.6 | 76.5 |
|  | High-aspect ratio pores | Average aspect ratio | 25.7 | 26.9 | 10.5 | 11.0 | 13.4 | 14.6 | 11.0 | 13.9 | 16.3 |
|  |  | Orientation angle [degrees] | 24.6 | 27.2 | 42.2 | 43.2 | 44.7 | 41.3 | 41.4 | 41.4 | 42.1 |
|  |  | Ratio relative to all voids [% by volume] | 27.0 | 13.3 | 0.7 | 0.6 | 6.1 | 11.0 | 12.1 | 3.4 | 9.0 |
| Catalytic performance |  | NOx removal ratio [%] | 84.2 | 91.1 | 87.8 | 86.4 | 91.5 | 84.3 | 87.8 | 90.7 | 84.3 |

TABLE 4

| | | | Ex. 28 | Ex. 29 | Ex. 30 | Ex. 31 | Ex. 32 | Ex. 33 | Ex. 34 | Ex. 35 |
|---|---|---|---|---|---|---|---|---|---|---|
| Oxide particle preparation step | Stirring treatment | Treatment time [minutes] | 25 | 16 | 24 | 16 | 13 | 25 | 15 | 4 |
| | Metal oxide particles | Particle diameter of particles (Volume-based cumulative 50% diameter value) [μm] | 3.2 | 4.6 | 3.2 | 4.6 | 6.4 | 3.2 | 4.6 | 9.5 |
| Fibrous organic material | | Raw material species | PET fiber | PET fiber | PET fiber | PMMA particles + TiOPr + PEG | PMMA particles + TiOPr + PEG | PMMA particles + TiOPr + PEG | PMMA particles + TiOPr + PEG | PMMA particles + TiOPr + PEG |
| | | Average fiber diameter or average diameter [μm] | 5.0 | 5.0 | 5.0 | 3.0 | 3.0 | 3.0 | 3.0 | 3.0 |
| | | Average aspect ratio | 10 | 10 | 10 | 11 | 11 | 11 | 11 | 11 |
| | | Mixed amount [parts by mass] | 3.0 | 3.0 | 5.0 | 3.0 | 3.0 | 5.0 | 5.0 | 5.0 |
| Catalyst coat layer | | Coating amount [g/L] | 100 | 100 | 100 | 100 | 100 | 100 | 100 | 100 |
| | | Particle diameter of catalyst particles (Cross-sectional area-based cumulative 15% diameter value) [μm] | 3.4 | 5.4 | 3.4 | 5.4 | 6.9 | 3.4 | 5.4 | 9.7 |
| | | Average thickness [μm] | 33.7 | 55.5 | 36.3 | 57.5 | 68.8 | 37.2 | 56.0 | 95.5 |
| | | Void fraction [% by volume] | 53.7 | 66.2 | 56.4 | 68.7 | 71.7 | 57.5 | 66.7 | 78.1 |
| | High-aspect ratio pores | Average aspect ratio | 11.7 | 12.5 | 12.8 | 12.1 | 11.1 | 13.0 | 13.8 | 16.5 |
| | | Orientation angle [degrees] | 41.1 | 40.3 | 38.3 | 41.0 | 42.3 | 43.7 | 43.8 | 43.9 |
| | | Ratio relative to all voids [% by volume] | 17.5 | 4.1 | 34.1 | 17.5 | 9.4 | 40.9 | 7.0 | 28.7 |
| Catalytic performance | | NOx removal ratio [%] | 88.5 | 83.7 | 88.7 | 80.9 | 91.3 | 85.9 | 91.8 | 85.9 |

TABLE 5

| | | | Ex. 36 | Ex. 37 | Ex. 38 | Ex. 39 | Ex. 40 | Ex. 41 | Ex. 42 |
|---|---|---|---|---|---|---|---|---|---|
| Oxide particle preparation step | Stirring treatment | Treatment time [minutes] | 25 | 17 | 12 | 5 | 16 | 16 | 16 |
| | Metal oxide particles | Particle diameter of particles (Volume-based cumulative 50% diameter value) [μm] | 3.2 | 4.6 | 6.4 | 9.5 | 4.6 | 4.6 | 4.6 |
| Fibrous organic material | | Raw material species | PMMA particles + TiOPr + PEG | PMMA particles + TiOPr + PEG | PMMA particles + TiOPr + PEG | PMMA particles + TiOPr + PEG | PET fiber | PET fiber | PET fiber |
| | | Average fiber diameter or average diameter [μm] | 3.0 | 3.0 | 3.0 | 3.0 | 2.0 | 2.0 | 2.0 |
| | | Average aspect ratio | 11 | 11 | 11 | 11 | 40 | 40 | 40 |
| | | Mixed amount [parts by mass] | 7.0 | 7.0 | 7.0 | 7.0 | 3.0 | 3.0 | 3.0 |
| Catalyst coat layer | | Coating amount [g/L] | 100 | 100 | 100 | 100 | 50 | 200 | 300 |
| | | Particle diameter of catalyst particles (Cross-sectional area-based cumulative 15% diameter value) [μm] | 3.4 | 5.4 | 6.9 | 9.7 | 5.4 | 5.4 | 5.4 |
| | | Average thickness [μm] | 35.1 | 57.8 | 69.2 | 90.0 | 28.0 | 102.3 | 152.1 |
| | | Void fraction [% by volume] | 54.6 | 68.5 | 73.0 | 78.7 | 66.9 | 68.2 | 69.4 |
| | High-aspect ratio pores | Average aspect ratio | 17.0 | 17.9 | 20.0 | 20.9 | 40.2 | 43.5 | 46.2 |
| | | Orientation angle [degrees] | 41.1 | 42.0 | 41.1 | 40.1 | 19.8 | 20.0 | 18.6 |
| | | Ratio relative to all voids [% by volume] | 23.1 | 16.3 | 15.8 | 19.8 | 35.9 | 38.2 | 39.4 |
| Catalytic performance | | NOx removal ratio [%] | 92.9 | 95.5 | 96.8 | 91.8 | 81.1 | 82.3 | 81.9 |

TABLE 6

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Oxide particle preparation step | Stirring treatment | Treatment time [minutes] | 41 | 36 | 24 | 15 | 12 | 6 | 3 |
| | Metal oxide particles | Particle diameter of particles (Volume-based cumulative 50% diameter value) [μm] | 0.7 | 1.9 | 3.2 | 4.6 | 6.4 | 9.5 | 12.0 |
| Fibrous organic material | | Raw material species | — | — | — | — | — | — | — |
| | | Average fiber diameter or average diameter [μm] | — | — | — | — | — | — | — |
| | | Average aspect ratio | — | — | — | — | — | — | — |

TABLE 6-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| or other solid organic material | Mixed amount [parts by mass] | — | — | — | — | — | — | — |
| Catalyst coat layer | Coating amount [g/L] | 100 | 100 | 100 | 100 | 100 | 100 | 100 |
|  | Particle diameter of catalyst particles (Cross-sectional area-based cumulative 15% diameter value) [μm] | 0.9 | 2.4 | 3.4 | 5.4 | 6.9 | 9.7 | 13.0 |
|  | Average thickness [μm] | 18.0 | 23.0 | 28.0 | 52.0 | 62.0 | 84.0 | 91.0 |
|  | Void fraction [% by volume] | 39.7 | 44.7 | 50.3 | 64.8 | 69.3 | 74.1 | 79.1 |
| High-aspect ratio pores | Average aspect ratio | 5.0 | 5.2 | 5.5 | 5.6 | 5.8 | 5.7 | 6.0 |
|  | Orientation angle [degrees] | 74.0 | 80.0 | 63.0 | 77.0 | 65.0 | 66.0 | 57.4 |
|  | Ratio relative to all voids [% by volume] | 0.01 | 0.02 | 0.04 | 0.06 | 0.08 | 0.09 | 0.11 |
| Catalytic performance | NOx removal ratio [%] | 60.0 | 65.2 | 73.0 | 73.8 | 72.4 | 72.1 | 63.5 |

TABLE 7

|  |  |  | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 | Comp. Ex. 16 |
|---|---|---|---|---|---|---|---|---|---|---|---|
| Oxide particle preparation step | Stirring treatment | Treatment time [minutes] | 3 | 45 | 3 | 45 | 24 | 45 | 3 | 3 | 3 |
|  | Metal oxide particles | Particle diameter of particles (Volume-based cumulative 50% diameter value) [μm] | 12.0 | 0.7 | 12.0 | 0.7 | 3.2 | 0.7 | 12.0 | 12.0 | 12.0 |
| Fibrous organic material or other solid organic material | Raw material species | | PET fiber | PET fiber | PET fiber | PET fiber | PET fiber | PET fiber | PET fiber | PET fiber | PET fiber |
|  | Average fiber diameter or average diameter [μm] | | 3.0 | 3.0 | 3.0 | 3.0 | 3.0 | 3.0 | 3.0 | 3.0 | 3.0 |
|  | Average aspect ratio | | 21 | 21 | 21 | 21 | 21 | 21 | 21 | 14 | 14 |
|  | Mixed amount [parts by mass] | | 1.0 | 3.0 | 3.0 | 5.0 | 5.0 | 7.0 | 7.0 | 5.0 | 9.0 |
| Catalyst coat layer | Coating amount [g/L] | | 100 | 100 | 100 | 100 | 100 | 100 | 100 | 100 | 100 |
|  | Particle diameter of catalyst particles (Cross-sectional area-based cumulative 15% diameter value) [μm] | | 13.0 | 0.9 | 13.0 | 0.9 | 3.4 | 0.9 | 13.0 | 13.0 | 13.0 |
|  | Average thickness [μm] | | 89.5 | 29.6 | 94.8 | 29.3 | 40.6 | 30.1 | 91.5 | 97.9 | 95.8 |
|  | Void fraction [% by volume] | | 77.9 | 50.9 | 80.0 | 50.8 | 59.6 | 50.8 | 78.6 | 81.4 | 80.4 |
| High-aspect ratio pores | Average aspect ratio | | 6.5 | 6.6 | 7.1 | 7.0 | 6.9 | 7.5 | 7.3 | 16.1 | 17.6 |
|  | Orientation angle [degrees] | | 70.2 | 59.2 | 60.2 | 54.1 | 60.4 | 53.1 | 60.0 | 40.3 | 42.1 |
|  | Ratio relative to all voids [% by volume] | | 0.12 | 59.86 | 11.60 | 59.46 | 51.19 | 59.58 | 15.32 | 11.26 | 15.26 |
| Catalytic performance | NOx removal ratio [%] | | 62.6 | 63.7 | 67.6 | 61.7 | 77.0 | 60.3 | 64.0 | 76.5 | 60.3 |

TABLE 8

|  |  |  | Comp. Ex. 17 | Comp. Ex. 18 | Comp. Ex. 19 | Comp. Ex. 20 | Comp. Ex. 21 | Comp. Ex. 22 | Comp. Ex. 23 | Comp. Ex. 24 | Comp. Ex. 25 |
|---|---|---|---|---|---|---|---|---|---|---|---|
| Oxide particle preparation step | Stirring treatment | Treatment time [minutes] | 24 | 14 | 17 | 6 | 3 | 12 | 3 | 24 | 12 |
|  | Metal oxide particles | Particle diameter of particles (Volume-based cumulative 50% diameter value) [μm] | 3.2 | 4.6 | 6.4 | 9.5 | 12.0 | 6.4 | 12.0 | 3.2 | 6.4 |
| Fibrous organic material or other solid organic material | Raw material species | | PET fiber | PET fiber | PET fiber | PET fiber | PET fiber | PET fiber | PET fiber | PET fiber | PET fiber |
|  | Average fiber diameter or average diameter [μm] | | 3.0 | 3.0 | 3.0 | 3.0 | 3.0 | 3.0 | 3.0 | 3.0 | 3.0 |
|  | Average aspect ratio | | 50 | 50 | 50 | 50 | 50 | 50 | 50 | 50 | 50 |
|  | Mixed amount [parts by mass] | | 1.0 | 1.0 | 1.0 | 1.0 | 1.0 | 2.0 | 2.0 | 3.0 | 3.0 |
| Catalyst coat layer | Coating amount [g/L] | | 100 | 100 | 100 | 100 | 100 | 100 | 100 | 100 | 100 |
|  | Particle diameter of catalyst particles (Cross-sectional area-based cumulative 15% diameter value) [μm] | | 3.4 | 5.4 | 6.9 | 9.7 | 13.0 | 6.9 | 13.0 | 3.4 | 6.9 |
|  | Average thickness [μm] | | 30.0 | 54.4 | 63.8 | 82.7 | 89.8 | 67.0 | 95.5 | 33.2 | 67.0 |
|  | Void fraction [% by volume] | | 50.9 | 65.7 | 71.3 | 77.2 | 78.2 | 71.0 | 79.2 | 54.1 | 72.2 |

TABLE 8-continued

|  |  |  | Comp. Ex. 17 | Comp. Ex. 18 | Comp. Ex. 19 | Comp. Ex. 20 | Comp. Ex. 21 | Comp. Ex. 22 | Comp. Ex. 23 | Comp. Ex. 24 | Comp. Ex. 25 |
|---|---|---|---|---|---|---|---|---|---|---|---|
|  | High-aspect ratio pores | Average aspect ratio | 50.2 | 50.0 | 53.0 | 50.1 | 40.2 | 52.4 | 45.1 | 53.3 | 51.3 |
|  |  | Orientation angle [degrees] | 7.2 | 8.2 | 9.2 | 10.1 | 12.1 | 9.0 | 20.1 | 6.9 | 8.1 |
|  |  | Ratio relative to all voids [% by volume] | 55.14 | 57.33 | 59.92 | 61.44 | 65.12 | 55.42 | 60.10 | 56.63 | 58.56 |
| Catalytic performance | NOx removal ratio [%] |  | 74.3 | 72.9 | 72.1 | 72.5 | 63.9 | 74.5 | 62.9 | 72.3 | 73.4 |

TABLE 9

|  |  |  | Comp. Ex. 26 | Comp. Ex. 27 | Comp. Ex. 28 | Comp. Ex. 29 | Comp. Ex. 30 | Comp. Ex. 31 | Comp. Ex. 32 | Comp. Ex. 33 | Comp. Ex. 34 |
|---|---|---|---|---|---|---|---|---|---|---|---|
| Oxide particle preparation step | Stirring treatment | Treatment time [minutes] | 5 | 24 | 14 | 3 | 24 | 14 | 6 | 5 | 3 |
|  | Metal oxide particles | Particle diameter of particles (Volume-based cumulative 50% diameter value) [μm] | 9.5 | 3.2 | 4.6 | 12.0 | 3.2 | 4.6 | 6.4 | 9.5 | 12.0 |
| Fibrous organic material or other solid organic material | Raw material species |  | PET fiber | PET fiber | PET fiber | PET fiber | PET fiber | PET fiber | PET fiber | PET fiber | PET fiber |
|  | Average fiber diameter or average diameter [μm] |  | 3.0 | 3.0 | 3.0 | 3.0 | 3.0 | 3.0 | 3.0 | 3.0 | 3.0 |
|  | Average aspect ratio |  | 50 | 50 | 50 | 50 | 50 | 50 | 50 | 50 | 50 |
|  | Mixed amount [parts by mass] |  | 3.0 | 5.0 | 5.0 | 5.0 | 7.0 | 7.0 | 7.0 | 7.0 | 7.0 |
| Catalyst coat layer | Coating amount [g/L] |  | 100 | 100 | 100 | 100 | 100 | 100 | 100 | 100 | 100 |
|  | Particle diameter of catalyst particles (Cross-sectional area-based cumulative 15% diameter value) [μm] |  | 9.7 | 3.4 | 5.4 | 13.0 | 3.4 | 5.4 | 6.9 | 9.7 | 13.0 |
|  | Average thickness [μm] |  | 86.9 | 36.8 | 61.8 | 99.6 | 34.1 | 61.3 | 68.6 | 92.7 | 99.0 |
|  | Void fraction [% by volume] |  | 78.1 | 56.1 | 70.0 | 81.0 | 55.2 | 69.5 | 72.9 | 79.2 | 81.6 |
|  | High-aspect ratio pores | Average aspect ratio | 54.2 | 54.0 | 51.9 | 40.1 | 51.0 | 52.8 | 52.5 | 58.2 | 50.0 |
|  |  | Orientation angle [degrees] | 9.4 | 6.7 | 6.7 | 10.6 | 6.0 | 6.8 | 7.2 | 6.9 | 9.6 |
|  |  | Ratio relative to all voids [% by volume] | 52.11 | 72.20 | 62.39 | 61.00 | 65.52 | 58.63 | 66.65 | 59.47 | 51.00 |
| Catalytic performance | NOx removal ratio [%] |  | 70.5 | 70.7 | 72.2 | 62.5 | 70.5 | 69.3 | 69.3 | 66.8 | 60.6 |

TABLE 10

|  |  |  | Comp. Ex. 35 | Comp. Ex. 36 | Comp. Ex. 37 | Comp. Ex. 38 | Comp. Ex. 39 | Comp. Ex. 40 | Comp. Ex. 41 |
|---|---|---|---|---|---|---|---|---|---|
| Oxide particle preparation step | Stirring treatment | Treatment time [minutes] | 3 | 3 | 45 | 45 | 3 | 45 | 3 |
|  | Metal oxide particles | Particle diameter of particles (Volume-based cumulative 50% diameter value) [μm] | 12.0 | 12.0 | 0.7 | 0.7 | 12.0 | 0.7 | 12.0 |
| Fibrous organic material or other solid organic material | Raw material species |  | PET fiber | PET fiber | PET fiber | PET fiber | PET fiber | PET fiber | PET fiber |
|  | Average fiber diameter or average diameter [μm] |  | 2.0 | 5.0 | 5.0 | 5.0 | 5.0 | 5.0 | 5.0 |
|  | Average aspect ratio |  | 21 | 10 | 10 | 10 | 10 | 10 | 10 |
|  | Mixed amount [parts by mass] |  | 7.0 | 1.0 | 2.0 | 3.0 | 3.0 | 5.0 | 7.0 |
| Catalyst coat layer | Coating amount [g/L] |  | 100 | 100 | 100 | 100 | 100 | 100 | 100 |
|  | Particle diameter of catalyst particles (Cross-sectional area-based cumulative 15% diameter value) [μm] |  | 13.0 | 13.0 | 0.9 | 0.9 | 13.0 | 0.9 | 13.0 |
|  | Average thickness [μm] |  | 99.0 | 92.8 | 28.3 | 31.7 | 92.9 | 34.3 | 98.3 |
|  | Void fraction [% by volume] |  | 80.7 | 79.7 | 49.2 | 53.4 | 80.2 | 54.0 | 80.0 |
|  | High-aspect ratio pores | Average aspect ratio | 15.4 | 6.1 | 8.2 | 8.4 | 6.5 | 9.8 | 7.1 |
|  |  | Orientation angle [degrees] | 25.1 | 60.2 | 37.6 | 38.0 | 40.5 | 35.8 | 42.0 |
|  |  | Ratio relative to all voids [% by volume] | 15.21 | 0.40 | 54.76 | 67.29 | 0.30 | 68.92 | 10.30 |
| Catalytic performance | NOx removal ratio [%] |  | 65.2 | 65.2 | 62.6 | 64.0 | 65.8 | 62.6 | 61.6 |

TABLE 11

|  |  |  | Comp. Ex. 42 | Comp. Ex. 43 | Comp. Ex. 44 | Comp. Ex. 45 | Comp. Ex. 46 | Comp. Ex. 47 | Comp. Ex. 48 |
|---|---|---|---|---|---|---|---|---|---|
| Oxide particle preparation step | Stirring treatment | Treatment time [minutes] | 45 | 31 | 24 | 12 | 3 | 3 | 45 |
|  | Metal oxide particles | Particle diameter of particles (Volume-based cumulative 50% diameter value) [μm] | 0.7 | 1.9 | 3.2 | 6.4 | 9.5 | 12.0 | 0.7 |
| Fibrous organic material or other solid organic material |  | Raw material species | Rod-like cellulose | Rod-like cellulose | Rod-like cellulose | Rod-like cellulose | Rod-like cellulose | Rod-like cellulose | Rod-like cellulose |
|  |  | Average fiber diameter or average diameter [μm] | 30.0 | 30.0 | 30.0 | 30.0 | 30.0 | 30.0 | 30.0 |
|  |  | Average aspect ratio | 3 | 3 | 3 | 3 | 3 | 3 | 3 |
|  |  | Mixed amount [parts by mass] | 1.0 | 1.0 | 1.0 | 1.0 | 1.0 | 1.0 | 2.0 |
| Catalyst coat layer |  | Coating amount [g/L] | 100 | 100 | 100 | 100 | 100 | 100 | 100 |
|  |  | Particle diameter of catalyst particles (Cross-sectional area-based cumulative 15% diameter value) [μm] | 0.7 | 1.9 | 3.2 | 6.4 | 9.5 | 12.0 | 0.7 |
|  |  | Average thickness [μm] | 18.9 | 21.5 | 29.5 | 65.8 | 83.7 | 91.5 | 26.5 |
|  |  | Void fraction [% by volume] | 40.0 | 43.4 | 50.3 | 72.1 | 76.6 | 79.9 | 48.0 |
|  | High-aspect ratio pores | Average aspect ratio | 5.1 | 5.2 | 5.5 | 5.9 | 5.7 | 6.1 | 5.0 |
|  |  | Orientation angle [degrees] | 83.0 | 71.0 | 74.0 | 61.0 | 63.0 | 69.0 | 81.0 |
|  |  | Ratio relative to all voids [% by volume] | 0.02 | 0.02 | 0.04 | 0.07 | 0.09 | 0.11 | 0.01 |
| Catalytic performance |  | NOx removal ratio [%] | 62.3 | 65.7 | 71.0 | 72.9 | 67.7 | 63.5 | 62.7 |

TABLE 12

|  |  |  | Comp. Ex. 49 | Comp. Ex. 50 | Comp. Ex. 51 | Comp. Ex. 52 | Comp. Ex. 53 | Comp. Ex. 54 | Comp. Ex. 55 |
|---|---|---|---|---|---|---|---|---|---|
| Oxide particle preparation step | Stirring treatment | Treatment time [minutes] | 24 | 16 | 12 | 5 | 45 | 31 | 24 |
|  | Metal oxide particles | Particle diameter of particles (Volume-based cumulative 50% diameter value) [μm] | 3.2 | 4.6 | 6.4 | 9.5 | 0.7 | 1.9 | 3.2 |
| Fibrous organic material or other solid organic material |  | Raw material species | Rod-like cellulose | Rod-like cellulose | Rod-like cellulose | Rod-like cellulose | Rod-like cellulose | Rod-like cellulose | Rod-like cellulose |
|  |  | Average fiber diameter or average diameter [μm] | 30.0 | 30.0 | 30.0 | 30.0 | 30.0 | 30.0 | 30.0 |
|  |  | Average aspect ratio | 3 | 3 | 3 | 3 | 3 | 3 | 3 |
|  |  | Mixed amount [parts by mass] | 2.0 | 2.0 | 2.0 | 2.0 | 3.0 | 3.0 | 3.0 |
| Catalyst coat layer |  | Coating amount [g/L] | 100 | 100 | 100 | 100 | 100 | 100 | 100 |
|  |  | Particle diameter of catalyst particles (Cross-sectional area-based cumulative 15% diameter value) [μm] | 3.2 | 4.6 | 6.4 | 9.5 | 0.7 | 1.9 | 3.2 |
|  |  | Average thickness [μm] | 37.8 | 57.0 | 73.5 | 90.6 | 33.6 | 34.0 | 47.0 |
|  |  | Void fraction [% by volume] | 56.8 | 67.8 | 73.8 | 78.9 | 54.7 | 54.7 | 62.7 |
|  | High-aspect ratio pores | Average aspect ratio | 5.5 | 5.7 | 5.8 | 5.7 | 5.0 | 5.2 | 5.5 |
|  |  | Orientation angle [degrees] | 83.0 | 74.0 | 78.0 | 60.0 | 60.0 | 63.0 | 81.0 |
|  |  | Ratio relative to all voids [% by volume] | 0.04 | 0.06 | 0.08 | 0.10 | 0.02 | 0.02 | 0.04 |
| Catalytic performance |  | NOx removal ratio [%] | 69.8 | 78.7 | 71.4 | 52.8 | 65.4 | 69.3 | 71.3 |

TABLE 13

|  |  |  | Comp. Ex. 56 | Comp. Ex. 57 | Comp. Ex. 58 | Comp. Ex. 59 | Comp. Ex. 60 | Comp. Ex. 61 | Comp. Ex. 62 |
|---|---|---|---|---|---|---|---|---|---|
| Oxide particle preparation step | Stirring treatment | Treatment time [minutes] | 12 | 5 | 3 | 45 | 31 | 24 | 16 |
|  | Metal oxide particles | Particle diameter of particles (Volume-based cumulative 50% diameter value) [μm] | 6.4 | 9.5 | 12.0 | 0.7 | 1.9 | 3.2 | 4.6 |
| Fibrous organic material or other |  | Raw material species | Rod-like cellulose | Rod-like cellulose | Rod-like cellulose | Rod-like cellulose | Rod-like cellulose | Rod-like cellulose | Rod-like cellulose |
|  |  | Average fiber diameter or average diameter [μm] | 30.0 | 30.0 | 30.0 | 30.0 | 30.0 | 30.0 | 30.0 |
|  |  | Average aspect ratio | 3 | 3 | 3 | 3 | 3 | 3 | 3 |

TABLE 13-continued

|  |  | Comp. Ex. 56 | Comp. Ex. 57 | Comp. Ex. 58 | Comp. Ex. 59 | Comp. Ex. 60 | Comp. Ex. 61 | Comp. Ex. 62 |
|---|---|---|---|---|---|---|---|---|
| solid organic material | Mixed amount [parts by mass] | 3.0 | 3.0 | 3.0 | 5.0 | 5.0 | 5.0 | 5.0 |
| Catalyst coat layer | Coating amount [g/L] | 100 | 100 | 100 | 100 | 100 | 100 | 100 |
|  | Particle diameter of catalyst particles (Cross-sectional area-based cumulative 15% diameter value) [μm] | 6.4 | 9.5 | 12.0 | 0.7 | 1.9 | 3.2 | 4.6 |
|  | Average thickness [μm] | 82.5 | 96.5 | 114.7 | 42.6 | 47.4 | 52.5 | 74.0 |
|  | Void fraction [% by volume] | 76.1 | 80.4 | 84.3 | 59.9 | 63.4 | 65.7 | 74.1 |
| High-aspect ratio pores | Average aspect ratio | 5.8 | 5.7 | 6.1 | 5.1 | 5.2 | 5.6 | 5.7 |
|  | Orientation angle [degrees] | 85.0 | 62.0 | 78.0 | 69.0 | 63.0 | 79.0 | 67.0 |
|  | Ratio relative to all voids [% by volume] | 0.09 | 0.09 | 0.12 | 0.01 | 0.03 | 0.04 | 0.06 |
| Catalytic performance | NOx removal ratio [%] | 56.2 | 53.0 | 59.4 | 61.0 | 65.3 | 55.2 | 74.0 |

TABLE 14

|  |  |  | Comp. Ex. 63 | Comp. Ex. 64 | Comp. Ex. 65 | Comp. Ex. 66 | Comp. Ex. 67 | Comp. Ex. 68 | Comp. Ex. 69 |
|---|---|---|---|---|---|---|---|---|---|
| Oxide particle preparation step | Stirring treatment | Treatment time [minutes] | 12 | 5 | 3 | 45 | 24 | 16 | 12 |
|  | Metal oxide particles | Particle diameter of particles (Volume-based cumulative 50% diameter value) [μm] | 6.4 | 9.5 | 12.0 | 0.7 | 3.2 | 4.6 | 6.4 |
| Fibrous organic material or other solid organic material | Raw material species |  | Rod-like cellulose | Rod-like cellulose | Rod-like cellulose | Rod-like cellulose | Rod-like cellulose | Rod-like cellulose | Rod-like cellulose |
|  | Average fiber diameter or average diameter [μm] |  | 30.0 | 30.0 | 30.0 | 30.0 | 30.0 | 30.0 | 30.0 |
|  | Average aspect ratio |  | 3 | 3 | 3 | 3 | 3 | 3 | 3 |
|  | Mixed amount [parts by mass] |  | 5.0 | 5.0 | 5.0 | 7.0 | 7.0 | 7.0 | 7.0 |
| Catalyst coat layer | Coating amount [g/L] |  | 100 | 100 | 100 | 100 | 100 | 100 | 100 |
|  | Particle diameter of catalyst particles (Cross-sectional area-based cumulative 15% diameter value) [μm] |  | 6.4 | 9.5 | 12.0 | 0.7 | 3.2 | 4.6 | 6.4 |
|  | Average thickness [μm] |  | 89.1 | 105.5 | 118.6 | 47.1 | 57.7 | 79.0 | 86.9 |
|  | Void fraction [% by volume] |  | 78.5 | 82.3 | 85.0 | 63.1 | 68.8 | 74.9 | 78.2 |
| High-aspect ratio pores | Average aspect ratio |  | 5.9 | 5.7 | 6.0 | 5.1 | 5.5 | 5.6 | 5.9 |
|  | Orientation angle [degrees] |  | 79.0 | 80.0 | 72.0 | 76.0 | 79.0 | 81.0 | 60.0 |
|  | Ratio relative to all voids [% by volume] |  | 0.09 | 0.10 | 0.12 | 0.02 | 0.05 | 0.07 | 0.08 |
| Catalytic performance | NOx removal ratio [%] |  | 56.8 | 53.4 | 58.0 | 60.5 | 54.4 | 70.8 | 56.1 |

TABLE 15

|  |  |  | Comp. Ex. 70 | Comp. Ex. 71 | Comp. Ex. 72 | Comp. Ex. 73 | Comp. Ex. 74 | Comp. Ex. 75 | Comp. Ex. 76 |
|---|---|---|---|---|---|---|---|---|---|
| Oxide particle preparation step | Stirring treatment | Treatment time [minutes] | 45 | 31 | 24 | 16 | 12 | 5 | 3 |
|  | Metal oxide particles | Particle diameter of particles (Volume-based cumulative 50% diameter value) [μm] | 0.7 | 1.9 | 3.2 | 4.6 | 6.4 | 9.5 | 12.0 |
| Fibrous organic material or other solid organic material | Raw material species |  | Pulverized cellulose | Pulverized cellulose | Pulverized cellulose | Pulverized cellulose | Pulverized cellulose | Pulverized cellulose | Pulverized cellulose |
|  | Average fiber diameter or average diameter [μm] |  | 1.0 | 1.0 | 1.0 | 1.0 | 1.0 | 1.0 | 1.0 |
|  | Average aspect ratio |  | 3 | 3 | 3 | 3 | 3 | 3 | 3 |
|  | Mixed amount [parts by mass] |  | 1.0 | 1.0 | 1.0 | 1.0 | 1.0 | 1.0 | 1.0 |
| Catalyst coat layer | Coating amount [g/L] |  | 100 | 100 | 100 | 100 | 100 | 100 | 100 |
|  | Particle diameter of catalyst particles (Cross-sectional area-based cumulative 15% diameter value) [μm] |  | 0.7 | 1.9 | 3.2 | 4.6 | 6.4 | 9.5 | 12.0 |
|  | Average thickness [μm] |  | 20.4 | 21.7 | 30.7 | 52.4 | 64.0 | 82.0 | 92.4 |
|  | Void fraction [% by volume] |  | 41.2 | 43.3 | 52.3 | 66.2 | 70.1 | 77.0 | 79.5 |

TABLE 15-continued

|  |  |  | Comp. Ex. 70 | Comp. Ex. 71 | Comp. Ex. 72 | Comp. Ex. 73 | Comp. Ex. 74 | Comp. Ex. 75 | Comp. Ex. 76 |
|---|---|---|---|---|---|---|---|---|---|
|  | High-aspect ratio pores | Average aspect ratio | 5.4 | 5.4 | 6.0 | 5.6 | 6.0 | 5.7 | 6.3 |
|  |  | Orientation angle [degrees] | 84.0 | 82.0 | 84.0 | 60.0 | 63.0 | 76.0 | 62.0 |
|  |  | Ratio relative to all voids [% by volume] | 0.01 | 0.02 | 0.05 | 0.06 | 0.08 | 0.10 | 0.11 |
| Catalytic performance |  | NOx removal ratio [%] | 67.4 | 68.3 | 76.9 | 73.7 | 73.1 | 72.4 | 63.2 |

TABLE 16

|  |  |  | Comp. Ex. 77 | Comp. Ex. 78 | Comp. Ex. 79 | Comp. Ex. 80 | Comp. Ex. 81 | Comp. Ex. 82 | Comp. Ex. 83 |
|---|---|---|---|---|---|---|---|---|---|
| Oxide particle preparation step | Stirring treatment | Treatment time [minutes] | 45 | 24 | 12 | 5 | 45 | 31 | 24 |
|  | Metal oxide particles | Particle diameter of particles (Volume-based cumulative 50% diameter value) [μm] | 0.7 | 3.2 | 6.4 | 9.5 | 0.7 | 1.9 | 3.2 |
| Fibrous organic material or other solid organic material |  | Raw material species | Pulverized cellulose | Pulverized cellulose | Pulverized cellulose | Pulverized cellulose | Pulverized cellulose | Pulverized cellulose | Pulverized cellulose |
|  |  | Average fiber diameter or average diameter [μm] | 1.0 | 1.0 | 1.0 | 1.0 | 1.0 | 1.0 | 1.0 |
|  |  | Average aspect ratio | 3 | 3 | 3 | 3 | 3 | 3 | 3 |
|  |  | Mixed amount [parts by mass] | 2.0 | 2.0 | 2.0 | 2.0 | 3.0 | 3.0 | 3.0 |
| Catalyst coat layer |  | Coating amount [g/L] | 100 | 100 | 100 | 100 | 100 | 100 | 100 |
|  |  | Particle diameter of catalyst particles (Cross-sectional area-based cumulative 15% diameter value) [μm] | 0.7 | 3.2 | 6.4 | 9.5 | 0.7 | 1.9 | 3.2 |
|  |  | Average thickness [μm] | 27.9 | 31.7 | 68.8 | 85.2 | 49.4 | 33.8 | 36.6 |
|  |  | Void fraction [% by volume] | 49.6 | 52.2 | 73.2 | 78.3 | 63.6 | 54.1 | 56.3 |
|  | High-aspect ratio pores | Average aspect ratio | 5.0 | 5.6 | 5.9 | 6.1 | 5.0 | 5.4 | 5.7 |
|  |  | Orientation angle [degrees] | 69.0 | 83.0 | 76.0 | 70.0 | 78.0 | 64.0 | 67.0 |
|  |  | Ratio relative to all voids [% by volume] | 0.01 | 0.05 | 0.09 | 0.10 | 0.01 | 0.03 | 0.05 |
| Catalytic performance |  | NOx removal ratio [%] | 78.1 | 78.2 | 73.5 | 72.4 | 78.9 | 73.4 | 75.1 |

TABLE 17

|  |  |  | Comp. Ex. 84 | Comp. Ex. 85 | Comp. Ex. 86 | Comp. Ex. 87 | Comp. Ex. 88 | Comp. Ex. 89 | Comp. Ex. 90 |
|---|---|---|---|---|---|---|---|---|---|
| Oxide particle preparation step | Stirring treatment | Treatment time [minutes] | 16 | 12 | 5 | 3 | 45 | 24 | 16 |
|  | Metal oxide particles | Particle diameter of particles (Volume-based cumulative 50% diameter value) [μm] | 4.6 | 6.4 | 9.5 | 12.0 | 0.7 | 3.2 | 4.6 |
| Fibrous organic material or other solid organic material |  | Raw material species | Pulverized cellulose | Pulverized cellulose | Pulverized cellulose | Pulverized cellulose | Pulverized cellulose | Pulverized cellulose | Pulverized cellulose |
|  |  | Average fiber diameter or average diameter [μm] | 1.0 | 1.0 | 1.0 | 1.0 | 1.0 | 1.0 | 1.0 |
|  |  | Average aspect ratio | 3 | 3 | 3 | 3 | 3 | 3 | 3 |
|  |  | Mixed amount [parts by mass] | 3.0 | 3.0 | 3.0 | 3.0 | 5.0 | 5.0 | 5.0 |
| Catalyst coat layer |  | Coating amount [g/L] | 100 | 100 | 100 | 100 | 100 | 100 | 100 |
|  |  | Particle diameter of catalyst particles (Cross-sectional area-based cumulative 15% diameter value) [μm] | 4.6 | 6.4 | 9.5 | 12.0 | 0.7 | 3.2 | 4.6 |
|  |  | Average thickness [μm] | 54.5 | 70.7 | 88.3 | 97.9 | 56.4 | 40.5 | 64.4 |
|  |  | Void fraction [% by volume] | 66.2 | 72.9 | 78.8 | 81.0 | 67.1 | 59.5 | 71.1 |
|  | High-aspect ratio pores | Average aspect ratio | 6.1 | 6.1 | 6.2 | 6.1 | 5.4 | 5.5 | 5.8 |
|  |  | Orientation angle [degrees] | 77.0 | 68.0 | 77.0 | 80.0 | 77.0 | 73.0 | 63.0 |
|  |  | Ratio relative to all voids [% by volume] | 0.06 | 0.08 | 0.09 | 0.11 | 0.02 | 0.04 | 0.06 |
| Catalytic performance |  | NOx removal ratio [%] | 72.6 | 73.2 | 70.6 | 63.3 | 78.7 | 75.1 | 71.8 |

TABLE 18

|  |  |  | Comp. Ex. 91 | Comp. Ex. 92 | Comp. Ex. 93 | Comp. Ex. 94 | Comp. Ex. 95 | Comp. Ex. 96 |
|---|---|---|---|---|---|---|---|---|
| Oxide particle preparation step | Stirring treatment | Treatment time [minutes] | 45 | 31 | 24 | 16 | 5 | 3 |
|  | Metal oxide particles | Particle diameter of particles (Volume-based cumulative 50% diameter value) [μm] | 0.7 | 1.9 | 3.2 | 6.4 | 9.5 | 12.0 |
| Fibrous organic material or other solid organic material |  | Raw material species | Pulverized cellulose | Pulverized cellulose | Pulverized cellulose | Pulverized cellulose | Pulverized cellulose | Pulverized cellulose |
|  |  | Average fiber diameter or average diameter [μm] | 1.0 | 1.0 | 1.0 | 1.0 | 1.0 | 1.0 |
|  |  | Average aspect ratio | 3 | 3 | 3 | 3 | 3 | 3 |
|  |  | Mixed amount [parts by mass] | 7.0 | 7.0 | 7.0 | 7.0 | 7.0 | 7.0 |
| Catalyst coat layer |  | Coating amount [g/L] | 100 | 100 | 100 | 100 | 100 | 100 |
|  |  | Particle diameter of catalyst particles (Cross-sectional area-based cumulative 15% diameter value) [μm] | 0.7 | 1.9 | 3.2 | 6.4 | 9.5 | 12.0 |
|  |  | Average thickness [μm] | 64.4 | 56.6 | 52.2 | 69.1 | 94.8 | 93.4 |
|  |  | Void fraction [% by volume] | 71.1 | 67.8 | 65.1 | 72.0 | 80.5 | 79.7 |
|  | High-aspect ratio pores | Average aspect ratio | 5.1 | 5.5 | 5.6 | 6.7 | 6.5 | 6.1 |
|  |  | Orientation angle [degrees] | 80.0 | 80.0 | 68.0 | 80.0 | 70.0 | 71.0 |
|  |  | Ratio relative to all voids [% by volume] | 0.01 | 0.02 | 0.05 | 0.08 | 0.10 | 0.12 |
| Catalytic performance |  | NOx removal ratio [%] | 73.3 | 68.3 | 71.4 | 69.3 | 67.6 | 63.2 |

TABLE 19

|  |  |  | Comp. Ex. 97 | Comp. Ex. 98 | Comp. Ex. 99 | Comp. Ex. 100 | Comp. Ex. 101 | Comp. Ex. 102 | Comp. Ex. 103 |
|---|---|---|---|---|---|---|---|---|---|
| Oxide particle preparation step | Stirring treatment | Treatment time [minutes] | 45 | 31 | 24 | 16 | 12 | 5 | 3 |
|  | Metal oxide particles | Particle diameter of particles (Volume-based cumulative 50% diameter value) [μm] | 0.7 | 1.9 | 3.2 | 4.6 | 6.4 | 9.5 | 12.0 |
| Fibrous organic material or other solid organic material |  | Raw material species | PMMA particles | PMMA particles | PMMA particles | PMMA particles | PMMA particles | PMMA particles | PMMA particles |
|  |  | Average fiber diameter or average diameter [μm] | 3.0 | 3.0 | 3.0 | 3.0 | 3.0 | 3.0 | 3.0 |
|  |  | Average aspect ratio | — | — | — | — | — | — | — |
|  |  | Mixed amount [parts by mass] | 1.0 | 1.0 | 1.0 | 1.0 | 1.0 | 1.0 | 1.0 |
| Catalyst coat layer |  | Coating amount [g/L] | 100 | 100 | 100 | 100 | 100 | 100 | 100 |
|  |  | Particle diameter of catalyst particles (Cross-sectional area-based cumulative 15% diameter value) [μm] | 0.7 | 1.9 | 3.2 | 4.6 | 6.4 | 9.5 | 12.0 |
|  |  | Average thickness [μm] | 20.6 | 21.2 | 28.7 | 52.7 | 63.9 | 77.3 | 89.2 |
|  |  | Void fraction [% by volume] | 42.1 | 43.1 | 50.7 | 66.0 | 71.2 | 75.0 | 77.7 |
|  | High-aspect ratio pores | Average aspect ratio | 5.1 | 5.2 | 5.5 | 5.6 | 5.8 | 5.8 | 6.0 |
|  |  | Orientation angle [degrees] | 81.0 | 80.0 | 79.0 | 73.0 | 74.0 | 83.0 | 62.0 |
|  |  | Ratio relative to all voids [% by volume] | 0.02 | 0.03 | 0.05 | 0.07 | 0.08 | 0.09 | 0.11 |
| Catalytic performance |  | NOx removal ratio [%] | 61.4 | 67.0 | 76.0 | 75.1 | 71.6 | 69.3 | 62.8 |

TABLE 20

|  |  |  | Comp. Ex. 104 | Comp. Ex. 105 | Comp. Ex. 106 | Comp. Ex. 107 | Comp. Ex. 108 | Comp. Ex. 109 | Comp. Ex. 110 | Comp. Ex. 111 |
|---|---|---|---|---|---|---|---|---|---|---|
| Oxide particle preparation step | Stirring treatment | Treatment time [minutes] | 45 | 24 | 12 | 45 | 24 | 16 | 2 | 5 |
|  | Metal oxide particles | Particle diameter of particles (Volume-based cumulative 50% diameter value) [μm] | 0.7 | 3.2 | 6.4 | 0.7 | 3.2 | 4.6 | 6.4 | 9.5 |
| Fibrous organic material or other |  | Raw material species | PMMA particles | PMMA particles | PMMA particles | PMMA particles | PMMA particles | PMMA particles | PMMA particles | PMMA particles |
|  |  | Average fiber diameter or average diameter [μm] | 3.0 | 3.0 | 3.0 | 3.0 | 3.0 | 3.0 | 3.0 | 3.0 |

TABLE 20-continued

|  |  |  | Comp. Ex. 104 | Comp. Ex. 105 | Comp. Ex. 106 | Comp. Ex. 107 | Comp. Ex. 108 | Comp. Ex. 109 | Comp. Ex. 110 | Comp. Ex. 111 |
|---|---|---|---|---|---|---|---|---|---|---|
| solid organic material | | Average aspect ratio | — | — | — | — | — | — | — | — |
| | | Mixed amount [parts by mass] | 2.0 | 2.0 | 2.0 | 3.0 | 3.0 | 3.0 | 3.0 | 3.0 |
| Catalyst coat layer | | Coating amount [g/L] | 100 | 100 | 100 | 100 | 100 | 100 | 100 | 100 |
| | | Particle diameter of catalyst particles (Cross-sectional area-based cumulative 15% diameter value) [μm] | 0.7 | 3.2 | 6.4 | 0.7 | 3.2 | 4.6 | 6.4 | 9.5 |
| | | Average thickness [μm] | 24.1 | 30.3 | 63.1 | 23.8 | 33.7 | 52.4 | 65.5 | 86.4 |
| | | Void fraction [% by volume] | 46.8 | 52.2 | 70.8 | 46.1 | 54.0 | 65.2 | 70.5 | 77.5 |
| | High-aspect ratio pores | Average aspect ratio | 5.1 | 5.6 | 5.8 | 5.1 | 5.6 | 5.6 | 5.9 | 5.8 |
| | | Orientation angle [degrees] | 75.0 | 78.0 | 81.0 | 81.0 | 62.0 | 65.0 | 77.0 | 69.0 |
| | | Ratio relative to all voids [% by volume] | 0.01 | 0.05 | 0.08 | 0.02 | 0.06 | 0.06 | 0.08 | 0.09 |
| Catalytic performance | | NOx removal ratio [%] | 63.7 | 75.1 | 71.1 | 65.3 | 77.1 | 74.1 | 73.4 | 69.5 |

TABLE 21

|  |  |  | Comp. Ex. 112 | Comp. Ex. 113 | Comp. Ex. 114 | Comp. Ex. 115 | Comp. Ex. 116 | Comp. Ex. 117 | Comp. Ex. 118 | Comp. Ex. 119 |
|---|---|---|---|---|---|---|---|---|---|---|
| Oxide particle preparation step | Stirring treatment | Treatment time [minutes] | 45 | 31 | 16 | 5 | 3 | 31 | 24 | 12 |
| | Metal oxide particles | Particle diameter of particles (Volume-based cumulative 50% diameter value) [μm] | 0.7 | 1.9 | 4.6 | 9.5 | 12.0 | 1.9 | 3.2 | 6.4 |
| Fibrous organic material or other solid organic material | | Raw material species | PMMA particles | PMMA particles | PMMA particles | PMMA particles | PMMA particles | PMMA particles | PMMA particles | PMMA particles |
| | | Average fiber diameter or average diameter [μm] | 3.0 | 3.0 | 3.0 | 3.0 | 3.0 | 3.0 | 3.0 | 3.0 |
| | | Average aspect ratio | — | — | — | — | — | — | — | — |
| | | Mixed amount [parts by mass] | 5.0 | 5.0 | 5.0 | 5.0 | 5.0 | 7.0 | 7.0 | 7.0 |
| Catalyst coat layer | | Coating amount [g/L] | 100 | 100 | 100 | 100 | 100 | 100 | 100 | 100 |
| | | Particle diameter of catalyst particles (Cross-sectional area-based cumulative 15% diameter value) [μm] | 0.7 | 1.9 | 4.6 | 9.5 | 12.0 | 1.9 | 3.2 | 6.4 |
| | | Average thickness [μm] | 25.9 | 27.7 | 56.8 | 84.2 | 95.0 | 30.3 | 37.1 | 69.2 |
| | | Void fraction [% by volume] | 47.2 | 49.0 | 68.4 | 78.0 | 80.1 | 52.3 | 57.3 | 72.7 |
| | High-aspect ratio pores | Average aspect ratio | 5.1 | 5.2 | 5.7 | 5.7 | 6.0 | 5.2 | 5.6 | 5.9 |
| | | Orientation angle [degrees] | 65.0 | 68.0 | 74.0 | 70.0 | 73.0 | 81.0 | 60.0 | 85.0 |
| | | Ratio relative to all voids [% by volume] | 0.01 | 0.02 | 0.06 | 0.12 | 0.12 | 0.02 | 0.05 | 0.09 |
| Catalytic performance | | NOx removal ratio [%] | 67.1 | 72.7 | 57.8 | 67.5 | 63.8 | 71.7 | 78.2 | 68.0 |

TABLE 22

|  |  |  | Comp. Ex. 120 | Comp. Ex. 121 | Comp. Ex. 122 | Comp. Ex. 123 | Comp. Ex. 124 | Comp. Ex. 125 | Comp. Ex. 126 | Comp. Ex. 127 |
|---|---|---|---|---|---|---|---|---|---|---|
| Oxide particle preparation step | Stirring treatment | Treatment time [minutes] | 5 | 3 | 31 | 3 | 3 | 3 | 16 | 16 |
| | Metal oxide particles | Particle diameter of particles (Volume-based cumulative 50% diameter value) [μm] | 9.5 | 12.0 | 1.9 | 12.0 | 12.0 | 12.0 | 4.6 | 4.6 |
| Fibrous organic material or other solid organic material | | Raw material species | PMMA particles | PMMA particles | PMMA particles + TiOPr + PEG | PMMA particles + TiOPr + PEG | PMMA particles + TiOPr + PEG | PMMA particles + TiOPr + PEG | PET fiber | PET fiber |
| | | Average fiber diameter or average diameter [μm] | 3.0 | 3.0 | 3.0 | 3.0 | 3.0 | 3.0 | 2.0 | 2.0 |
| | | Average aspect ratio | — | — | 11 | 11 | 11 | 11 | 40 | 40 |
| | | Mixed amount [parts by mass] | 7.0 | 7.0 | 1.0 | 1.0 | 3.0 | 7.0 | 3.0 | 3.0 |
| Catalyst coat layer | | Coating amount [g/L] | 100 | 100 | 100 | 100 | 100 | 100 | 30 | 400 |
| | | Particle diameter of catalyst particles (Cross-sectional area-based cumulative 15% diameter value) [μm] | 9.5 | 12.0 | 1.9 | 12.0 | 12.0 | 12.0 | 4.6 | 4.6 |
| | | Average thickness [μm] | 85.9 | 97.6 | 21.6 | 92.3 | 98.6 | 93.9 | 22.0 | 181.6 |
| | | Void fraction [% by volume] | 77.0 | 80.2 | 45.0 | 79.4 | 80.1 | 79.2 | 66.9 | 70.4 |

TABLE 22-continued

|  |  |  | Comp. Ex. 120 | Comp. Ex. 121 | Comp. Ex. 122 | Comp. Ex. 123 | Comp. Ex. 124 | Comp. Ex. 125 | Comp. Ex. 126 | Comp. Ex. 127 |
|---|---|---|---|---|---|---|---|---|---|---|
|  | High-aspect ratio pores | Average aspect ratio | 5.8 | 6.0 | 5.5 | 5.1 | 6.1 | 5.4 | 41.1 | 43.6 |
|  |  | Orientation angle [degrees] | 79.0 | 85.0 | 46.9 | 69.0 | 65.0 | 42.0 | 20.1 | 26.4 |
|  |  | Ratio relative to all voids [% by volume] | 0.10 | 0.11 | 0.37 | 0.20 | 0.51 | 0.41 | 32.21 | 46.10 |
| Catalytic performance |  | NOx removal ratio [%] | 63.8 | 59.9 | 69.8 | 62.3 | 69.1 | 79.0 | 75.0 | 72.0 |

TABLE 23

|  | Ex. 1 | Ex. 2 | Ex. 6 | Comp. Ex. 1 | Comp. Ex. 2 | Comp. Ex. 3 |
|---|---|---|---|---|---|---|
| Modal pore diameter of primary peak [μm] | 1.2 | 3.9 | 6.7 | 0.22 | 0.48 | 1.1 |

<Pore Diameter Distribution of Catalyst Coat Layer>

As is apparent from the results shown in FIG. 7 and Table 23, it was found that the catalyst coat layers of the catalysts (Examples 1, 2, and 6 and Comparative Example 3) produced by using the metal oxide particles having particle diameters (cumulative 50% diameters in volume-based cumulative particle size distributions) in a range of 3 to 10 μm each had at least two peaks in the pore diameter distribution measured by the mercury intrusion method, and the modal pore diameter of the peak (primary peak) having the largest modal pore diameter among these peaks was in a range of 1 to 10 μm. Meanwhile, it was found that the catalyst coat layers of the catalysts (Comparative Examples 1 and 2) produced by using the metal oxide particles having particle diameters (cumulative 50% diameters in volume-based cumulative particle size distributions) of less than 3 μm each had at least two peaks in the pore diameter distribution measured by the mercury intrusion method, but the modal pore diameter of the peak (primary peak) having the largest modal pore diameter among these peaks was smaller than 1 μm.

<Relationship Between Coating Amount of Catalyst Coat Layer and Catalytic Performance>

Figure 8:
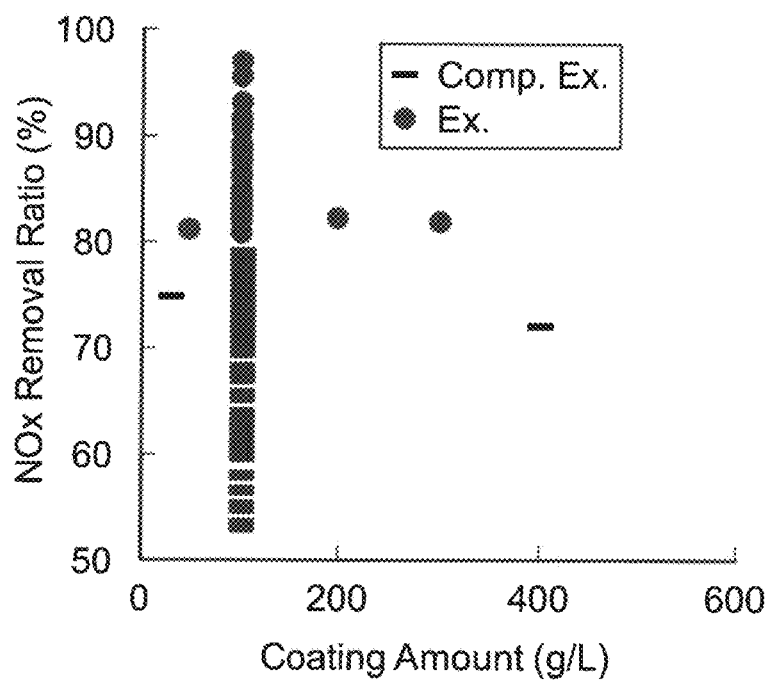
FIG. 8 is a graph showing the results of a catalytic performance evaluation test of catalysts obtained in Examples 1 to 42 and Comparative Examples 1 to 127, and showing the relationship between the coating amount of the catalyst coat layer and the NOx removal ratio.

As a graph showing the results of a catalytic performance evaluation test of the catalysts obtained in Examples 1 to 42 and Comparative Examples 1 to 127, FIG. 8 shows a graph showing the relationship between the coating amount of the catalyst coat layer and the NOx removal ratio. As is apparent from a comparison between the results of Examples 1 to 42 and the results of Comparative Examples 1 to 127 shown in FIG. 8 and Tables 1 to 22, it was found that the catalysts for purification of exhaust gas of Examples 1 to 42 each exhibited an excellent catalyst performance also in a high-load region with a high gas flow rate, with the coating amount of the catalyst coat layer being in a range of 50 to 300 g/L.

<Relationship Between Average Thickness of Catalyst Coat Layer and Catalytic Performance>

Figure 9:
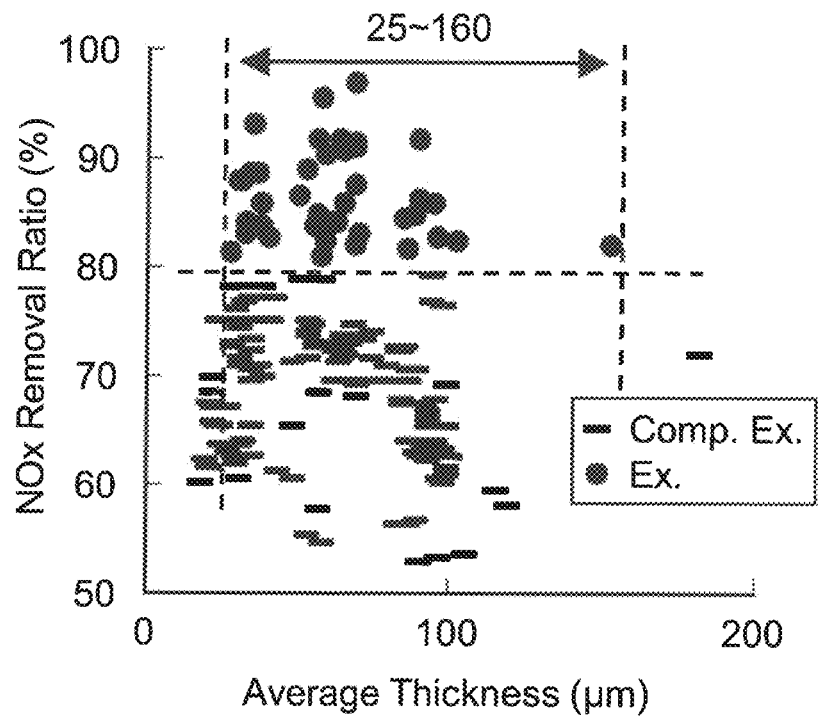
FIG. 9 is a graph showing results of a catalytic performance evaluation test of the catalysts obtained in Examples 1 to 42 and Comparative Examples 1 to 127, and showing the relationship between the average thickness of the catalyst coat layer and the NOx removal ratio.

As a graph showing the results of a catalytic performance evaluation test of the catalysts obtained in Examples 1 to 42 and Comparative Examples 1 to 127, FIG. 9 shows a graph showing the relationship between the average thickness of the catalyst coat layer and the NOx removal ratio. As is apparent from a comparison between the results of Examples 1 to 42 and the results of Comparative Examples 1 to 127 shown in FIG. 9 and Tables 1 to 22, it was found that the catalysts for purification of exhaust gas of Examples 1 to 42 each exhibited an excellent catalyst performance also in a high-load region with a high gas flow rate, with the average thickness of the catalyst coat layer being in a range of 25 to 160 μm.

<Relationship Between Particle Diameter of Catalyst Particles and Catalytic Performance>

Figure 10:
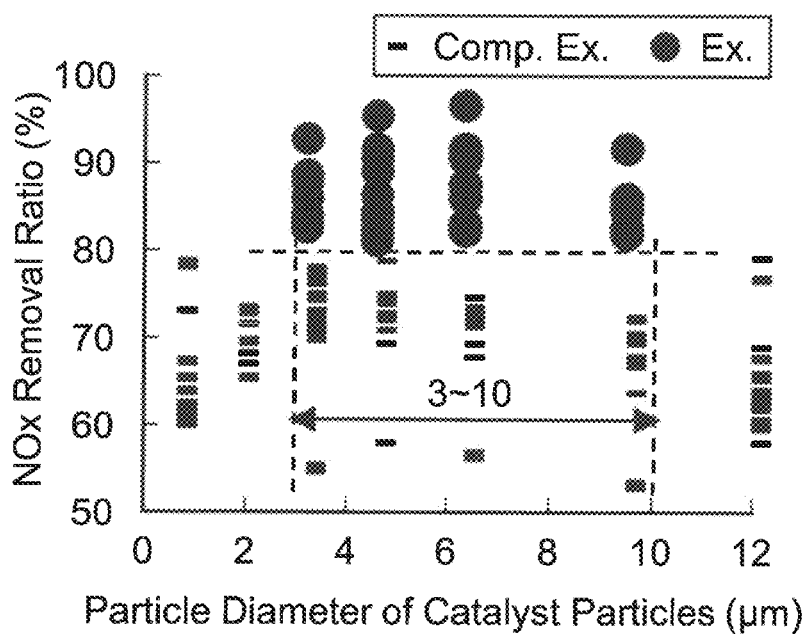
FIG. 10 is a graph showing results of a catalytic performance evaluation test of the catalysts obtained in Examples 1 to 42 and Comparative Examples 1 to 127, and showing the relationship between the particle diameter of catalyst particles and the NOx removal ratio.

As a graph showing the results of a catalytic performance evaluation test of the catalysts obtained in Examples 1 to 42 and Comparative Examples 1 to 127, FIG. 10 shows a graph showing the relationship between the particle diameter of catalyst particles (the cumulative 15% diameter value in the cross-sectional area-based cumulative particle size distribution of the catalyst particles) and the NOx removal ratio. As is apparent from a comparison between the results of Examples 1 to 42 and the results of Comparative Examples 1 to 127 shown in FIG. 10 and Tables 1 to 22, it was found that the catalysts for purification of exhaust gas of Examples 1 to 42 each exhibited an excellent catalyst performance also in a high-load region with a high gas flow rate, with the particle diameter (cross-sectional area-based cumulative 15% diameter value) of catalyst particles being in a range of 3 to 10 μm.

<Relationship Between Void Fraction of Catalyst Coat Layer and Catalytic Performance>

Figure 11:
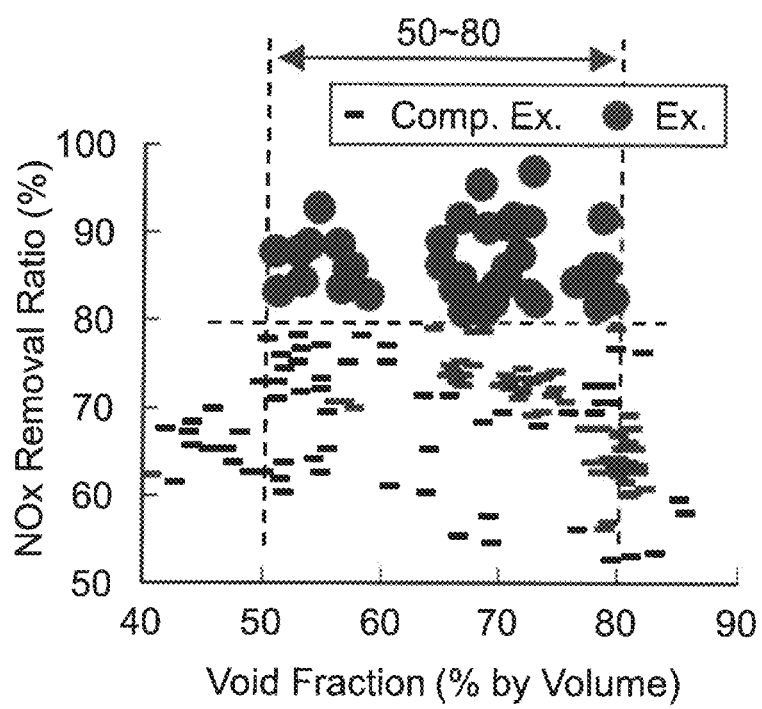
FIG. 11 is a graph showing results of a catalytic performance evaluation test of the catalysts obtained in Examples 1 to 42 and Comparative Examples 1 to 127, and showing the relationship between the void fraction of the catalyst coat layer and the NOx removal ratio.

As a graph showing the results of a catalytic performance evaluation test of the catalysts obtained in Examples 1 to 42 and Comparative Examples 1 to 127, FIG. 11 shows a graph showing the relationship between the void fraction of the catalyst coat layer and the NOx removal ratio (the void fraction being measured by a weight-in-water method). As is apparent from a comparison between the results of Examples 1 to 42 and the results of Comparative Examples 1 to 127 shown in FIG. 11 and Tables 1 to 22, it was found that the catalysts for purification of exhaust gas of Examples 1 to 42 each exhibited an excellent catalyst performance also in a high-load region with a high gas flow rate, with the void fraction of the catalyst coat layer being in a range of 50 to 80% by volume.

<Relationship Between Average Aspect Ratio of High-Aspect Ratio Pores and Catalytic Performance>

Figure 12:
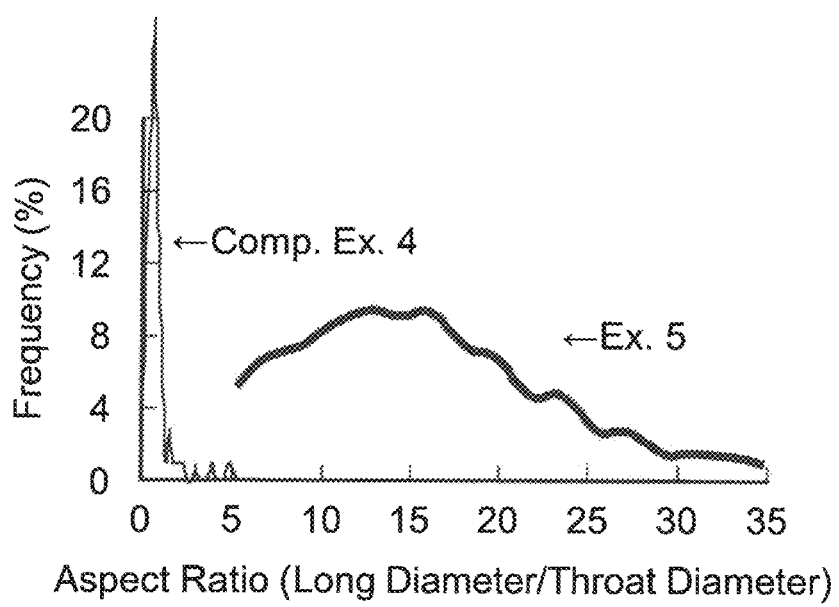
FIG. 12 is a graph showing the relationship between the aspect ratio and the frequency of high-aspect ratio pores of the catalyst obtained in Example 5 and the relationship between the aspect ratio and the frequency of pores of the catalyst obtained in Comparative Example 4.

First, FIG. 12 shows a graph showing the relationship between the aspect ratio of high-aspect ratio pores of the catalyst obtained in Example 5 and the frequency (%) (the aspect ratio being determined by analyzing pores having equivalent circle diameters of 2 μm or more in cross-sectional images of cross-sections of the catalyst coat layer which the cross-sections were perpendicular to the flow direction of exhaust gas in the substrate, and being an aspect ratio of high-aspect ratio pores having aspect ratios of 5 or higher among the pores). Note that FIG. 12 also shows the relationship between the aspect ratio and the frequency (%) of pores in the catalyst obtained in Comparative Example 4. From a comparison between the results of Example 5 and the results of Comparative Example 4 shown in FIG. 12, it was found that the high-aspect ratio pores were very few in the catalyst for purification of exhaust gas for comparison of Comparative Example 4.

Figure 13:
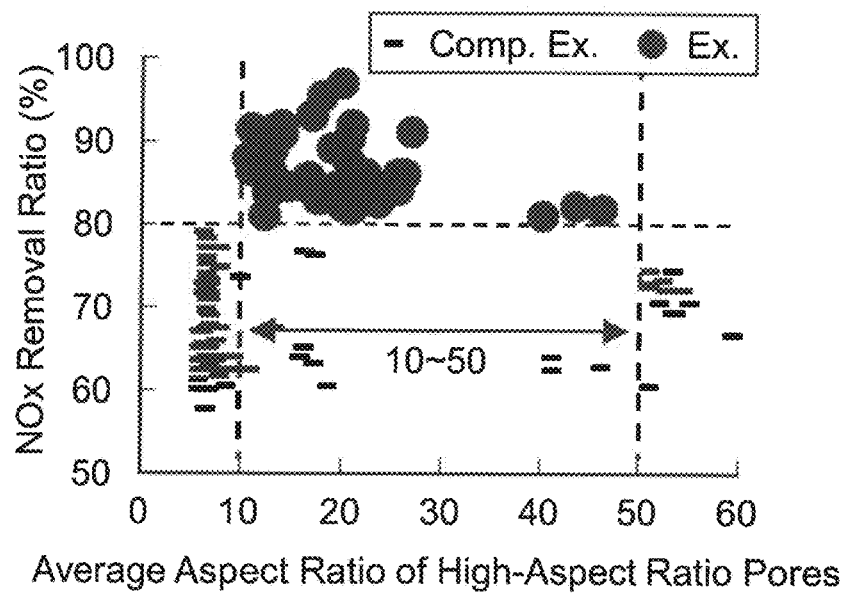
FIG. 13 is a graph showing results of a catalytic performance evaluation test of the catalysts obtained in Examples 1 to 42 and Comparative Examples 1 to 127, and showing the relationship between the average aspect ratio of high-aspect ratio pores and the NOx removal ratio.

Next, as a graph showing the results of a catalytic performance evaluation test of the catalysts obtained in Examples 1 to 42 and Comparative Examples 1 to 127, FIG. 13 shows a graph showing the relationship between the average aspect ratio of high-aspect ratio pores and the NOx removal ratio (the average aspect ratio being determined by analyzing pores having equivalent circle diameters of 2 μm or more in cross-sectional images of cross-sections of the catalyst coat layer which the cross-sections were perpendicular to the flow direction of exhaust gas in the substrate, and being an average aspect ratio of high-aspect ratio pores having aspect ratios of 5 or higher among these pores). As is apparent from a comparison between the results of Examples 1 to 42 and the results of Comparative Examples 1 to 127 shown in FIG. 13 and Tables 1 to 22, the catalysts for purification of exhaust gas of Examples 1 to 42 each exhibited an excellent catalyst performance also in a high-load region with a high gas flow rate, with the average aspect ratio of the high-aspect ratio pores in a range of 10 to 50.

<Relationship Between Ratio of High-Aspect Ratio Pores Relative to all Voids and Catalytic Performance>

Figure 14:
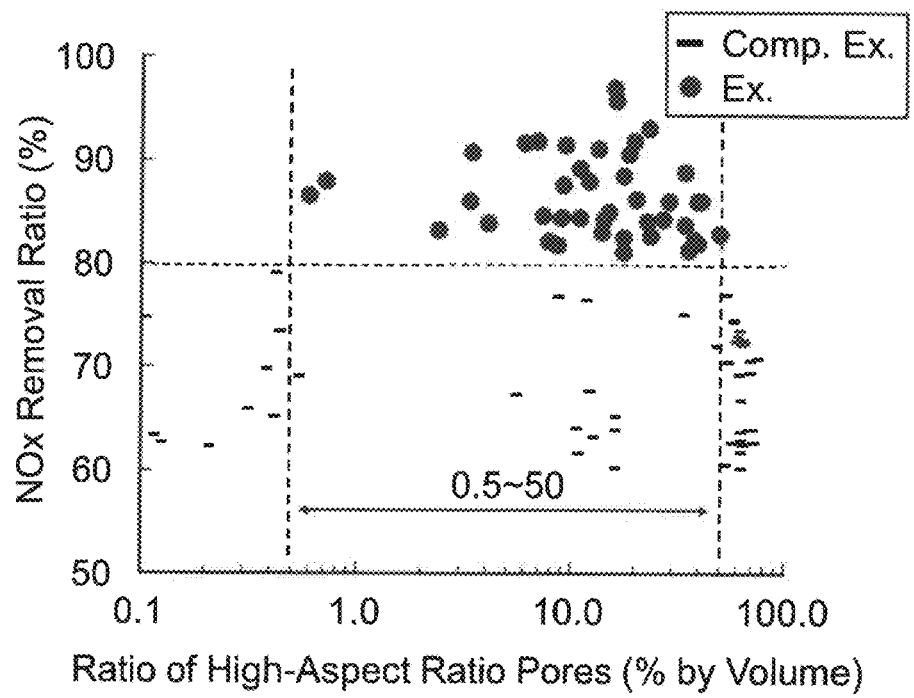
FIG. 14 is a graph showing results of a catalytic performance evaluation test of the catalysts obtained in Examples 1 to 42 and Comparative Examples 1 to 127, and showing the relationship between the ratio of high-aspect ratio pores relative to all voids and the NOx removal ratio.

As a graph showing the results of a catalytic performance evaluation test of the catalysts obtained in Examples 1 to 42 and Comparative Examples 1 to 127, FIG. 14 shows a graph showing the relationship between the ratio of the high-aspect ratio pores relative to all voids (the ratio of the high-aspect ratio pores) and the NOx removal ratio. As is apparent from a comparison between the results of Examples 1 to 42 and the results of Comparative Examples 1 to 127 shown in FIG. 14 and Tables 1 to 22, it was found that the catalysts for purification of exhaust gas of Examples 1 to 42 exhibited an excellent catalyst performance also in a high-load region with a high gas flow rate, with the ratio of the high-aspect ratio pores relative to all the voids being in a range of 0.5 to 50%.

<Relationship Between Cumulative 80% Angle Value of High-Aspect Ratio Pores and Catalytic Performance>

Figure 15:
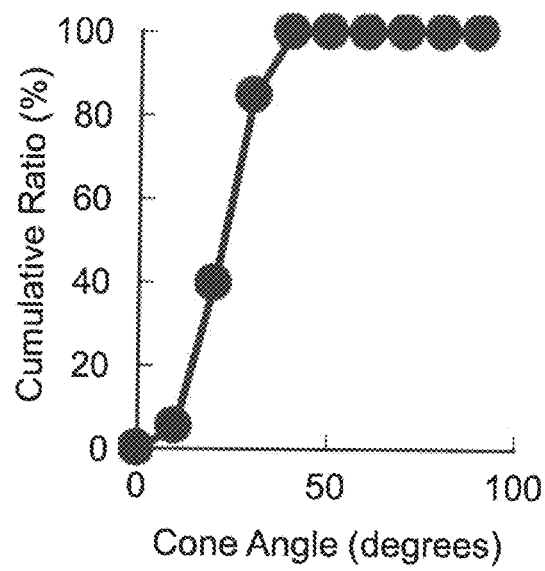
FIG. 15 is a graph showing the relationship between the cone angle and the cumulative ratio of high-aspect ratio pores of the catalyst obtained in Example 16.

First, FIG. 15 shows a graph showing the relationship between the cone angle (degrees (°)) of the high-aspect ratio pores of the catalyst obtained in Example 16 and the cumulative ratio (%) (the cone angle being the angle formed by the vector Y in the long diameter direction of the high-aspect ratio pore and the vector X in the flow direction of exhaust gas in the substrate). From FIG. 15, it was found that the cone angle had a distribution.

Figure 16:
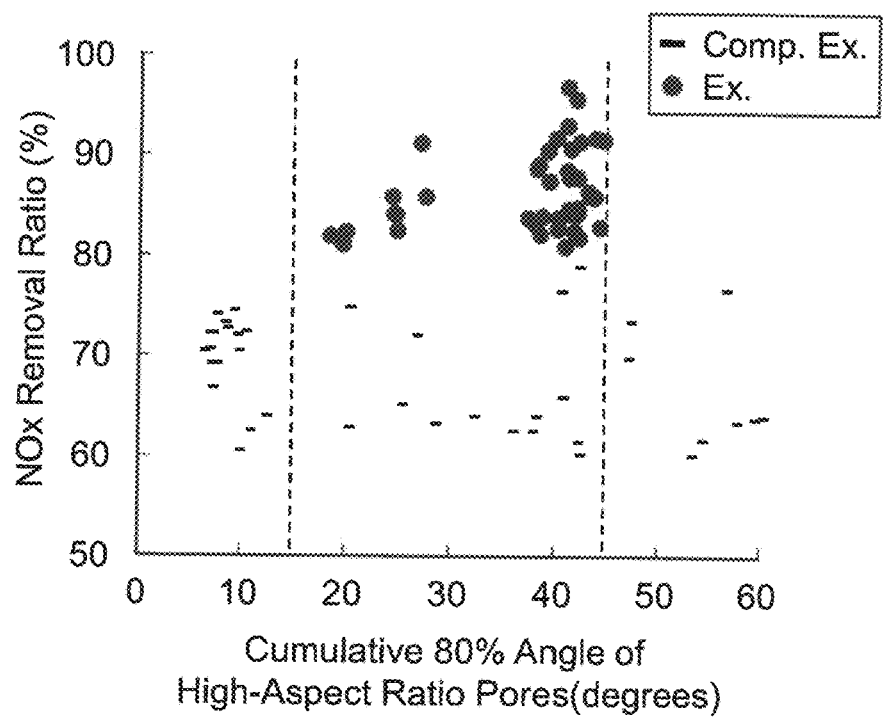
FIG. 16 is a graph showing results of a catalytic performance evaluation test of the catalysts obtained in Examples 1 to 42 and Comparative Examples 1 to 127, showing the relationship between the cumulative 80% angle value of high-aspect ratio pores and the NOx removal ratio.

Next, as a graph showing the results of a catalytic performance evaluation test of the catalysts obtained in Examples 1 to 42 and Comparative Examples 1 to 127, FIG. 16 shows a graph showing the relationship between the cumulative 80% angle value of the high-aspect ratio pores and the NOx removal ratio (the cumulative 80% angle value being a cumulative 80% angle value in an angle-based cumulative angle distribution of the angles (cone angles) each formed by the vector Y in the long diameter direction of each high-aspect ratio pore and the vector X in the flow direction of exhaust gas in the substrate). As is apparent from a comparison between the results of Examples 1 to 42 and the results of Comparative Examples 1 to 127 shown in FIG. 16 and Tables 1 to 22, it was found that the catalysts for purification of exhaust gas of Examples 1 to 42 exhibited an excellent catalyst performance also in a high-load region with a high gas flow rate, with the orientation angle (angle-based cumulative 80% angle value) of the high-aspect ratio pores being in a range of 0 to 45 degrees (°).

Example 43 to 45

Each catalyst slurry was obtained in the same manner as in Example 4, except that the treatment time using the bead mill was set as shown in Table 24, the stirring treatment was performed using the bead mill such that the particle diameter of the metal oxide particles took the value shown in Table 24 in terms of the cumulative 50% diameter value in a volume-based cumulative particle size distribution, a fibrous organic material with the raw material species, the average fiber diameter, the average aspect ratio, and the mixed amount shown in Table 24 and a spherical organic material with the raw material species, the average diameter, and the mixed amount shown in Table 24 were used as the solid organic material. Next, the obtained catalyst slurry was applied onto (used to coat) a cordierite monolithic honeycomb substrate and calcined in the same manner as in Example 4. Thus, each catalyst for purification of exhaust gas (catalyst sample) was obtained.

Note that Table 24 shows the treatment time [minutes] of the stirring treatment and the particle diameter (volume-based cumulative 50% diameter value) [μm] of the obtained metal oxide particles in the oxide particle preparation step, the raw material species, the average fiber diameter [μm], the average aspect ratio, and the mixed amount [parts by mass] of the fibrous organic material used in the catalyst slurry preparation step, the raw material species, the average diameter [μm], and the mixed amount [parts by mass] of the spherical organic material used in the catalyst slurry preparation step, and the coating amount [g/L] of the catalyst coat layer.

TABLE 24

| | | | Ex. 4 | Ex. 43 | Ex. 44 | Ex. 45 |
|---|---|---|---|---|---|---|
| Oxide particle preparation step | Stirring treatment | Treatment time [minutes] | 7 | 7 | 7 | 7 |
| | Metal oxide particles | Particle diameter of particles (Volume-based cumulative 50% diameter value) [μm] | 9.5 | 9.5 | 9.5 | 9.5 |
| Solid organic material | Fibrous organic material | Raw material species | PET fiber | PET fiber | PET fiber | PET fiber |
| | | Average fiber diameter or average diameter [μm] | 3.0 | 3.0 | 3.0 | 3.0 |
| | | Average aspect ratio | 14 | 14 | 14 | 14 |
| | | Mixed amount [parts by mass] | 1.0 | 1.0 | 1.0 | 1.0 |
| | Spherical organic material | Raw material species | — | PMMA particles | PMMA particles | PMMA particles |
| | | Average diameter [μm] | — | 3.0 | 3.0 | 3.0 |
| | | Mixed amount [parts by mass] | — | 0.1 | 0.3 | 1.0 |

TABLE 24-continued

|  |  | Ex. 4 | Ex. 43 | Ex. 44 | Ex. 45 |
|---|---|---|---|---|---|
|  | Ratio of fibrous organic material mixed [% by mass] | 100 | 91 | 77 | 50 |
| Catalyst coat layer | Coating amount [g/L] | 100 | 100 | 100 | 100 |
| Catalytic performance | NOx removal ratio [%] | 81.7 | 81.0 | 76.5 | 72.2 |

<Relationship Between Ratio of Fibrous Organic Material Mixed and Catalytic Performance>

As is apparent from the results shown in Table 24, it was found that the catalytic performance in the high-load region with a high gas flow rate was improved with the increase in the ratio of the fibrous organic material mixed relative to the whole solid organic material, and it was found that the catalysts for purification of exhaust gas (Examples 4 and 43), in which the ratio of the fibrous organic material mixed relative to the whole solid organic material was 80% by mass or higher, were capable of exhibiting an especially excellent catalyst performance in the high-load region with a high gas flow rate.

From the above-described results, it has been found that the catalyst for purification of exhaust gas of the present invention is capable of exhibiting an excellent catalyst performance also in a high-load region with a high gas flow rate.

INDUSTRIAL APPLICABILITY

As described above, according to the present invention, it is possible to provide a catalyst for purification of exhaust gas capable of exhibiting an excellent catalyst performance also in a high-load region with a high gas flow rate, a method for producing the same, and a method for purification of exhaust gas using the same.

Accordingly, the catalyst for purification of exhaust gas, the method for producing the same, and the method for purification of exhaust gas using the same of the present invention are especially useful as a catalyst for purification of exhaust gas for removing harmful components contained in exhaust gas emitted from an internal combustion engine such as an automotive engine, a method for producing the same, and a method for purification of exhaust gas using the same.

The invention claimed is:

1. A catalyst for purification of exhaust gas, comprising:
a substrate; and
a catalyst coat layer which is formed on a surface of the substrate and which comprises catalyst particles, wherein
the catalyst coat layer has an average thickness in a range of 25 to 160 μm, and a void fraction in a range of 50 to 80% by volume as measured by a weight-in-water method,
0.5 to 50% by volume of all voids in the catalyst coat layer consist of high-aspect ratio pores which have equivalent circle diameters in a range of 2 to 50 μm in a cross-sectional image of a cross-section of the catalyst coat layer which the cross-section is perpendicular to a flow direction of exhaust gas in the substrate, and which have aspect ratios of 5 or higher, and
the high-aspect ratio pores have an average aspect ratio in a range of 10 to 50.

2. The catalyst for purification of exhaust gas according to claim 1, wherein
the high-aspect ratio pores are oriented such that a cumulative 80% angle value in an angle-based cumulative angle distribution of angles (cone angles) each formed by a vector in a long diameter direction and a vector in the flow direction of exhaust gas in the substrate is in a range of 0 to 45 degrees.

3. The catalyst for purification of exhaust gas according to claim 1, wherein
0.6 to 40.9% by volume of all the voids in the catalyst coat layer consist of the high-aspect ratio pores, and
the high-aspect ratio pores have an average aspect ratio in a range of 10 to 35.

4. The catalyst for purification of exhaust gas according to claim 1, wherein
particle diameters of the catalyst particles are such that a cumulative 15% diameter value in a cross-sectional area-based cumulative particle size distribution of the catalyst particles based on scanning electron microscope (SEM) observation of a cross-section of the catalyst coat layer is in a range of 3 to 10 μm.

5. The catalyst for purification of exhaust gas according to claim 1, wherein
a coating amount of the catalyst coat layer is in a range of 50 to 300 g/L per unit volume of the substrate.

6. A method for producing a catalyst for purification of exhaust gas, comprising:
a step of obtaining a catalyst slurry by mixing metal oxide particles having a cumulative 50% diameter value in a range of 3 to 10 μm in a volume-based cumulative particle size distribution measured by laser diffractometry, a noble metal raw material, and a fibrous organic material having an average fiber diameter in a range of 1.7 to 8.0 μm and having an average aspect ratio in a range of 9 to 40 such that an amount of the fibrous organic material is in a range of 0.5 to 9.0 parts by mass relative to 100 parts by mass of the metal oxide particles;
a step of forming a catalyst slurry layer by applying the catalyst slurry onto a surface of a substrate such that a catalyst coat layer after calcination has an average thickness in a range of 25 to 160 μm; and
a calcination step of removing at least part of the fibrous organic material in the catalyst slurry layer to obtain a catalyst for purification of exhaust gas.

7. The method for producing a catalyst for purification of exhaust gas according to claim 6, wherein
the fibrous organic material has an average fiber diameter in a range of 2.0 to 6.0 μm and an average aspect ratio in a range of 9 to 30.

8. The method for producing a catalyst for purification of exhaust gas according to claim 6, wherein
in the step of forming a catalyst slurry layer, the catalyst slurry is applied onto the surface of the substrate such that a coating amount of the catalyst coat layer after the calcination is in a range of 50 to 300 g/L per unit volume of the substrate.

9. A method for purification of exhaust gas, comprising bringing exhaust gas emitted from an internal combustion engine into contact with the catalyst for purification of exhaust gas according to claim 1 to purify the exhaust gas.

* * * * *